United States Patent
Kawashima et al.

(10) Patent No.: US 8,676,452 B2
(45) Date of Patent: Mar. 18, 2014

(54) HYBRID TYPE WORKING MACHINE

(75) Inventors: Koji Kawashima, Yokosuka (JP); Makoto Yanagisawa, Yokosuka (JP)

(73) Assignee: Sumitomo Heavy Industries, Ltd., Tokyo (JP)

(*) Notice: Subject to any disclaimer, the term of this patent is extended or adjusted under 35 U.S.C. 154(b) by 150 days.

(21) Appl. No.: 13/262,263

(22) PCT Filed: Mar. 31, 2010

(86) PCT No.: PCT/JP2010/055885
§ 371 (c)(1),
(2), (4) Date: Sep. 30, 2011

(87) PCT Pub. No.: WO2010/114030
PCT Pub. Date: Oct. 7, 2010

(65) Prior Publication Data
US 2012/0035815 A1 Feb. 9, 2012

(30) Foreign Application Priority Data
Apr. 1, 2009 (JP) .................................. 2009-089123

(51) Int. Cl.
*G06F 7/70* (2006.01)
(52) U.S. Cl.
USPC .............. 701/50; 701/22; 701/54; 180/65.21; 180/65.27; 903/903
(58) Field of Classification Search
USPC .............. 701/22, 36, 50, 54; 180/65.21, 65.1, 180/65.27; 903/903
See application file for complete search history.

(56) References Cited

FOREIGN PATENT DOCUMENTS

| JP | 02-099721 A | 4/1990 |
|---|---|---|
| JP | 2000-289494 A | 10/2000 |
| JP | 2002-180860 A | 6/2002 |
| JP | 2007-290607 A | 11/2007 |
| JP | 2009-013632 A | 1/2009 |

OTHER PUBLICATIONS

International Search Report application No. PCT/JP2010/055885 dated Nov. 24, 2011.
International Search Report application No. PCT/JP2010/055885 dated Jun. 15, 2010.

*Primary Examiner* — Gertrude Arthur Jeanglaude
(74) *Attorney, Agent, or Firm* — Squire Sanders (US) LLP

(57) ABSTRACT

A hybrid-type working machine 1 includes an engine 11; a supercharger 42; an electric generator 12 that performs electricity generation by the driving force of the engine 11 and assists the driving force of the engine 11 through its own driving force; an inverter circuit 18A that is connected to an electric terminal of the electric generator 12; and a controller 30 which includes a nonvolatile memory 31 that stores first information indicating a correlation between the revolutions of the engine 11, the boost pressure of the supercharger 42 and an output upper limit value of the engine 11, and drives the inverter circuit 18A. The controller 30 controls the inverter circuit 18A so that the electric generator 12 assists the driving force when the required output exceeds the output upper limit value, based on a correlation stored in the nonvolatile memory 31.

8 Claims, 16 Drawing Sheets

Fig.5

| BOOST PRESSURE / REVOLUTIONS | △△ | △△ | ・・・・・ | △△ |
|---|---|---|---|---|
| ○○○ | ×× | ×× | ・・・・・ | ×× |
| ○○○ | ×× | ×× | ・・・・・ | ×× |
| ⋮ | ⋮ | ⋮ | ・・・・・ | ⋮ |
| ○○○ | ×× | ×× | ・・・・・ | ×× |

Fig.9
(a)
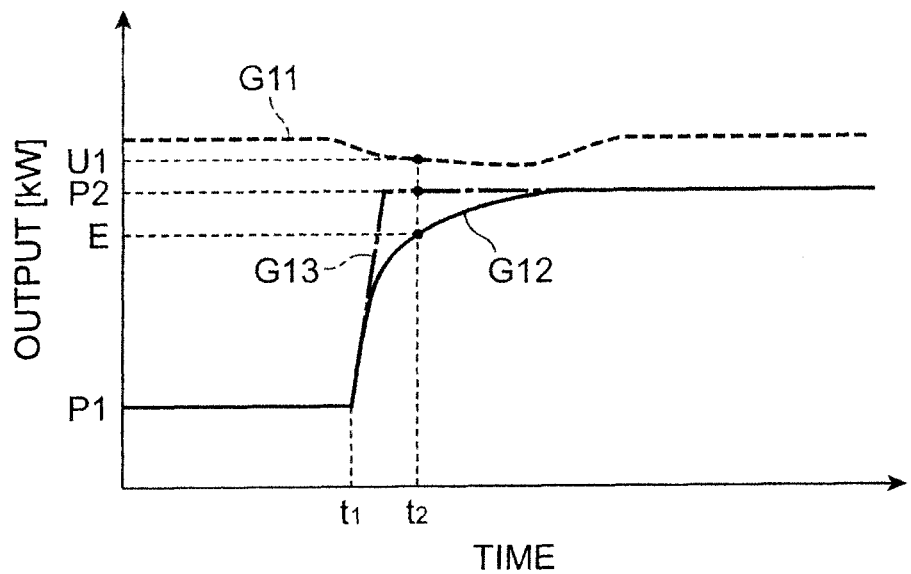
(b)
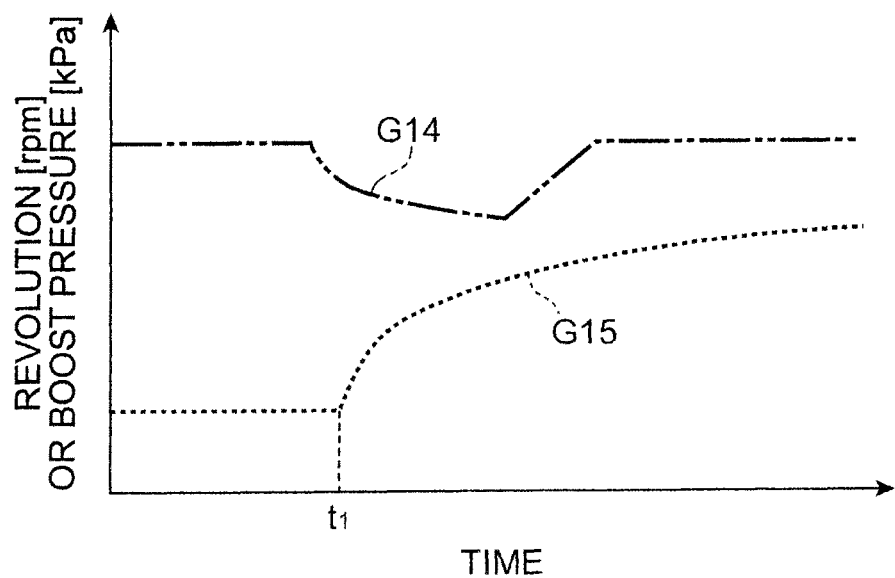

*Fig.10*
(a)
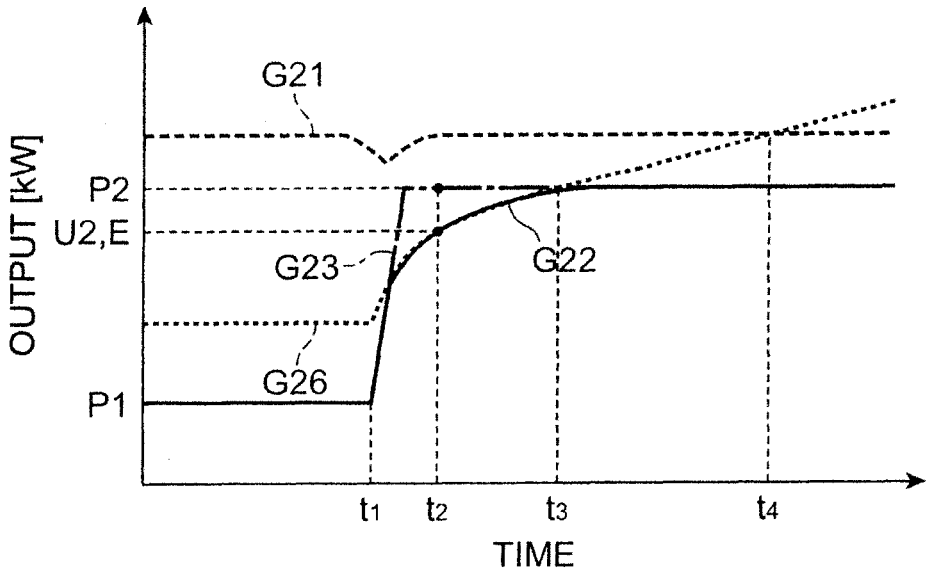
(b)
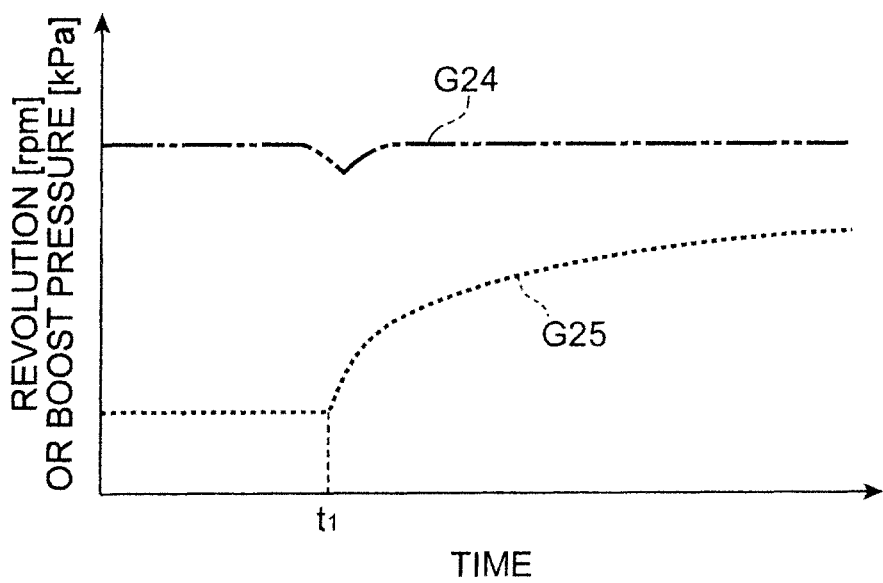

Fig.11
(a)
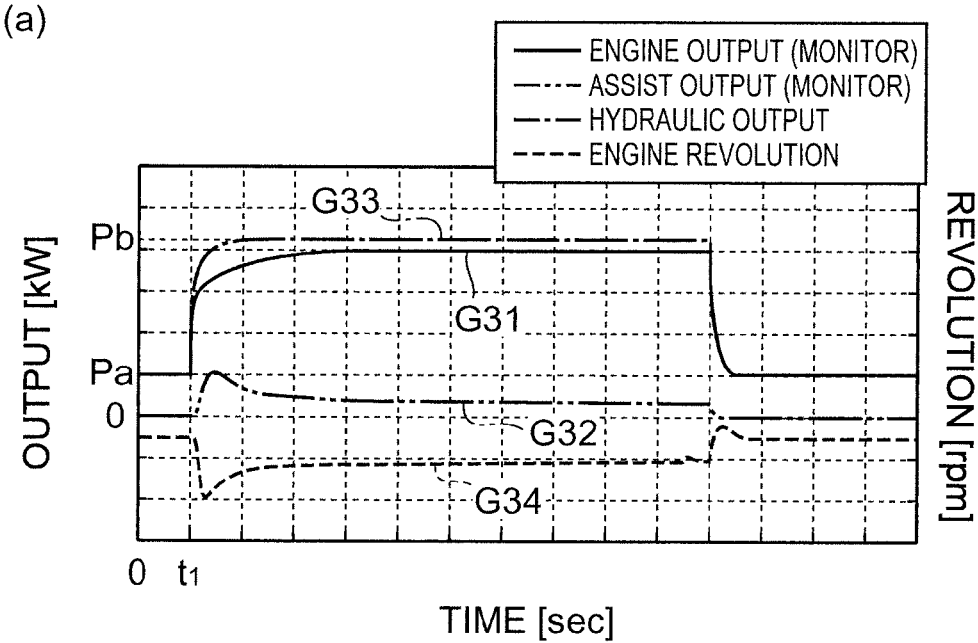
(b)
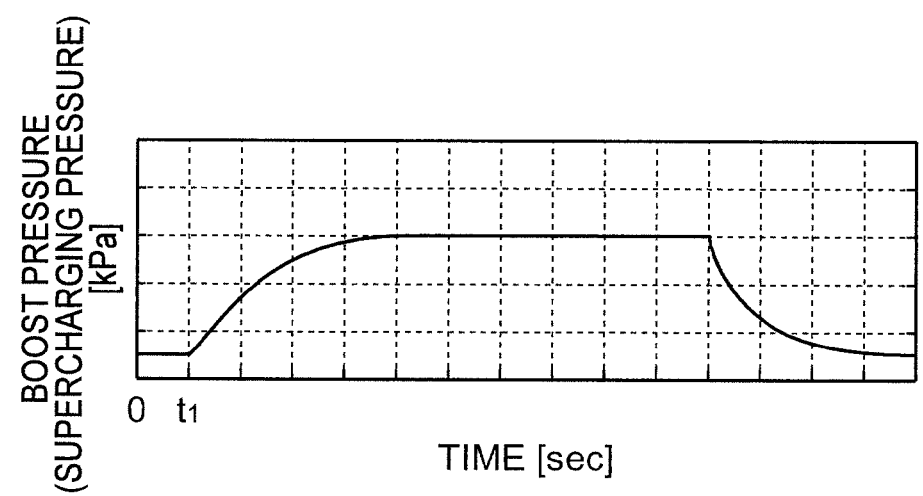

Fig.15
(a)
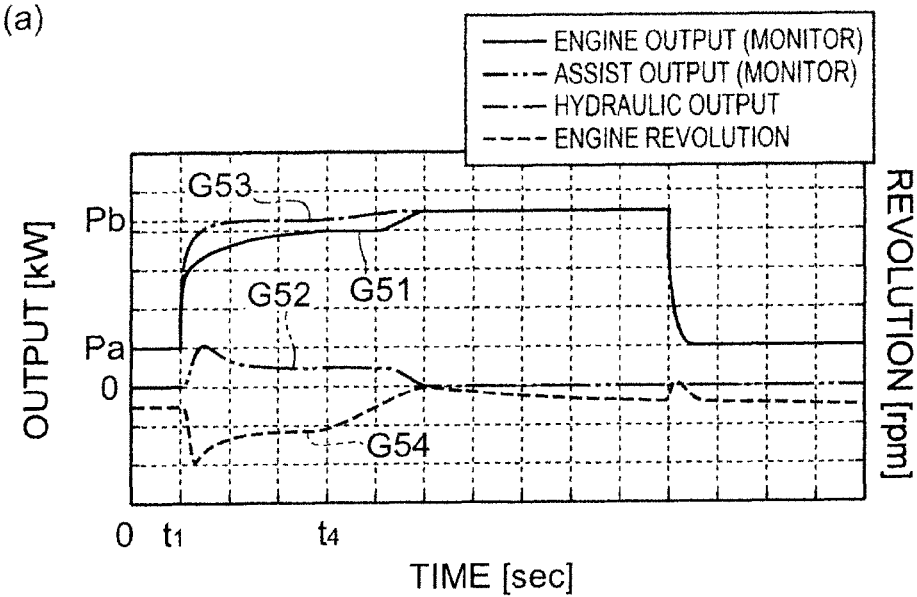
(b)
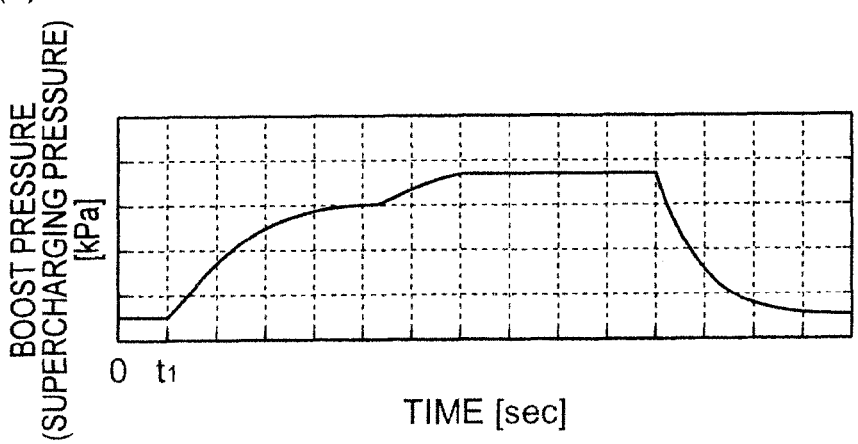

HYBRID TYPE WORKING MACHINE

TECHNICAL FIELD

The present invention relates to a hybrid-type working machine.

BACKGROUND ART

From the past, a working machine has been suggested in which a part of a driving mechanism is electrified. Such a working machine includes a hydraulic pump for hydraulically driving movable portions such as, for example, a boom, an arm, and a bucket, and an AC motor (an electric generator) is connected to an internal combustion engine motor (an engine) for driving the hydraulic pump, whereby an operation of assisting the driving force of the engine, and an operation of charging the electric power obtained by the electricity generation to a storage battery are respectively performed as necessary. For example, in PTL 1, such a hybrid-type working machine is disclosed. In the hybrid-type working machine described in PTL 1, depending on the request power of the hydraulic pump, the distribution of power to be output by the electric generator for assisting the engine is determined, and the power distribution is corrected so that deviation between target revolutions and the real revolutions of the engine is resolved.

CITATION LIST

Patent Literature

[PTL 1]
JP-A-2007-290607

SUMMARY OF INVENTION

Technical Problem

In the hybrid-type working machine, in some cases, a supercharger is provided which supplies the engine with compressed air. In this case, the engine output is greatly influenced by the supercharging pressure. Since the supercharging pressure is delayed in a time manner from an increase in the revolutions of the engine and tends to be increased, even when the revolutions of the engine are increased, a time delay occurs until a normal output corresponding to the revolutions is obtained. Thus, when the output depending on the current revolutions is obtained in such a state to suppress (or generate the electricity using the engine output) an auxiliary output of the electric generator, there is concern that the load to the engine becomes excessive and the engine may be stopped.

The present invention has been made in view of the above circumstances, and an object thereof is to suppress overloading of the engine in a hybrid-type working machine having a supercharger.

Solution to Problem

In order to solve the problem, the hybrid-type working machine according to the present invention includes an internal combustion engine motor; a supercharger that supplies the internal combustion engine motor with compressed air; an electric generator that is connected to the internal combustion engine motor to perform electricity generation by the driving force of the internal combustion engine motor and assists the driving force of the internal combustion engine motor through its own driving force; an inverter circuit that is connected to an electric terminal of the electric generator; and a control portion that drives the inverter circuit and includes a memory portion, which stores first information indicating a correlation between the revolutions of the internal combustion engine motor, the supercharging pressure of the supercharger and an output upper limit value (unit=kW) of the internal combustion engine motor. The control portion controls the inverter circuit so that the electric generator assists the driving force of the internal combustion engine motor when the required output (unit: kW) exceeds the output upper limit value based on first information stored in the memory portion.

The control portion may control the inverter circuit so as to perform electricity generation in the electric generator by the driving force of the internal combustion engine motor when the required output falls below the output upper limit value.

The control portion may estimate the supercharging pressure of the supercharger based on the magnitude of the torque of the internal combustion engine motor. Otherwise, the hybrid-type working machine may include a supercharging pressure sensor that detects the supercharging pressure of the supercharger and provides information on the supercharging pressure to the control portion.

The memory portion may further store second information on the maximum output value depending on the revolutions of the internal combustion engine motor, and the control portion may control the inverter circuit by setting the maximum output value as an output upper limit value, when the maximum output value based on second information is smaller than the output upper limit value based on first information.

The memory portion of the control portion may further store third information which indicates a fuel supply amount to the internal combustion engine motor and the maximum supercharging pressure of the supercharger depending on the revolutions of the internal combustion engine motor, and fourth information which indicates a correlation between a limit value of a fuel supply amount to the internal combustion engine motor corresponding to the output upper limit value and the supercharging pressure of the supercharger, and when a difference between the maximum supercharging pressure obtained from third information and the supercharging pressure of the supercharger obtained from fourth information is lower than a predetermined threshold value, by controlling the inverter circuit so that the electric generator assists the driving force of the internal combustion engine motor, the revolutions of the internal combustion engine motor may be increased.

The predetermined threshold value may be changed depending on the fuel supply amount.

The control portion may have a supercharging pressure decision portion that calculates the difference between the maximum supercharging pressure obtained from third information and the supercharging pressure of the supercharger obtained from fourth information and determines the magnitude between the difference and a predetermined threshold value, and an target revolution setting portion that sets an target revolution of the internal combustion engine higher than a case where it is determined that the difference exceeds the predetermined threshold value, when it is determined that the difference in the supercharging value decision portion falls below the predetermined threshold value, whereby the control portion may control the inverter circuit so that the revolutions of the internal combustion engine motor reach the target revolution.

Advantageous Effects of Invention

According to the present invention, in the hybrid-type working machine having the supercharger, overloading of the engine can be suppressed.

BRIEF DESCRIPTION OF DRAWINGS

FIG. 5 is a block diagram that shows a configuration example of an engine limitation table.

FIGS. 9A and 9B are graphs for describing the operation of a hybrid-type working machine of the related art in which a graph G11 shows a rated output (that is, a rated value of the output corresponding to the revolutions of the engine), a graph G12 shows an output that can be realized by the engine, a graph G13 shows a request output of a main pump, a graph G14 shows the actual revolutions of the engine, and a graph G15 shows the actual boost pressure of the supercharger.

FIGS. 10A and 10B are graphs for describing the operation of a hybrid-type construction machine in which a graph G21 shows a rated output, a graph G22 shows an output that can be realized by the engine, a graph G23 shows a request output of the main pump, a graph G26 shows an upper limit (that is, an upper value of the output to be calculated in the engine limit amount estimation portion) of the output of the engine considering the boost pressure, a graph G24 shows the actual revolutions of the engine, and a graph G25 shows the actual boost pressure of the supercharger.

FIG. 11A is a graph that shows time changes of each of an engine output, an electric generator (an assist motor) output, a hydraulic output, and engine revolutions of the hybrid-type working machine according to a first embodiment.

FIG. 11B is a graph that shows a time change of a boost pressure of the hybrid-type working machine according to the first embodiment.

FIG. 15A is a graph that shows time changes of each of an engine output, an electric generator (an assist motor) output, a hydraulic output, and engine revolutions of the hybrid-type working machine according to the second embodiment.

FIG. 15B is a graph that shows a time change of a boost pressure of the hybrid-type working machine according to the second embodiment.

DESCRIPTION OF EMBODIMENTS

Figure 1:
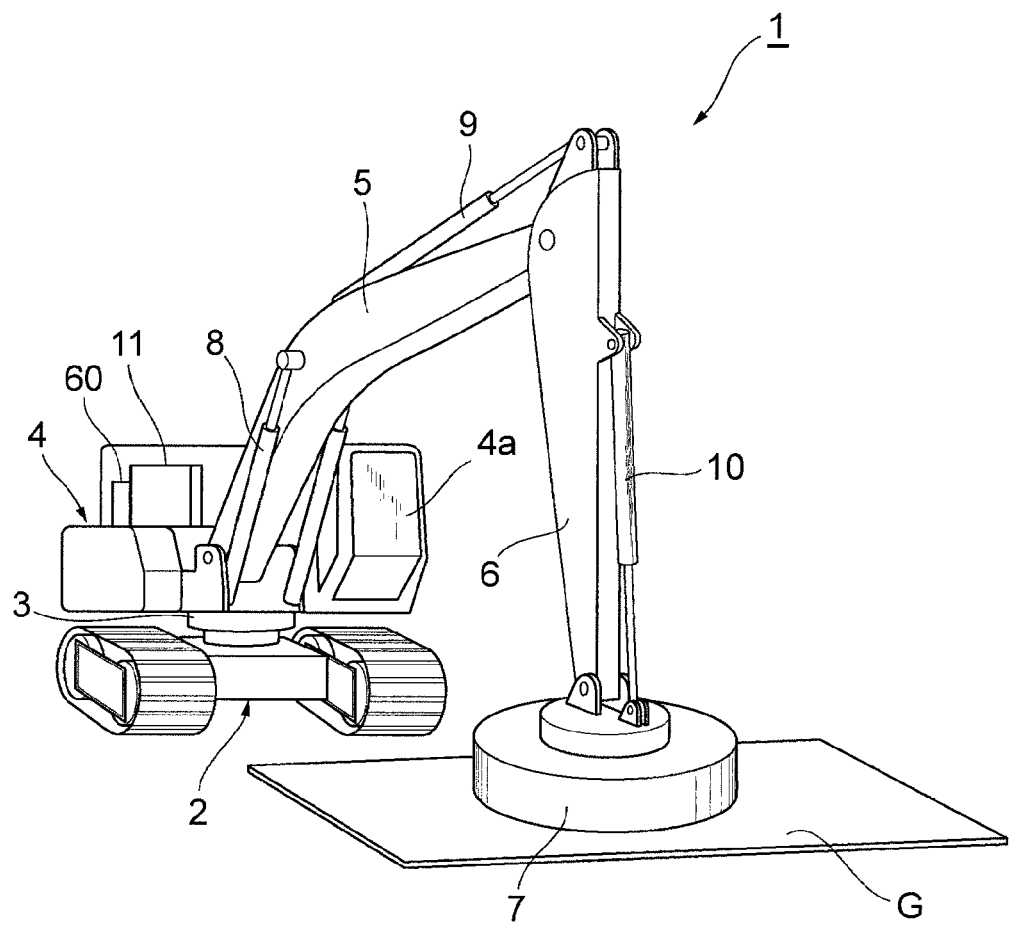
FIG. 1 is a perspective view that shows an exterior of a hybrid-type construction machine as an example of a working machine according to the present invention.

Hereinafter, en embodiment of a hybrid-type working machine according to the present invention will be described in detail with reference to the attached drawings. In addition, the same elements are denoted by the same reference numerals in the description of the drawings and the overlapped description will be omitted.

First Embodiment

FIG. 1 is a perspective view that shows an exterior of a hybrid-type construction machine 1 as an example of a hybrid-type working machine according to the present invention. As shown in FIG. 1, the hybrid-type construction machine 1 is a so-called lifting magnet vehicle, and includes a running mechanism 2 including an endless track, and a turner 4 that is rotatably placed on the running mechanism 2 via a turning mechanism 3. A boom 5, an arm 6 that is link-connected to a tip of the boom 5, and a lifting magnet 7 that is link connected to a tip of the arm 6 are attached to the turner 4. The lifting magnet 7 is equipment for adsorbing and capturing a load G such as a rigid material by magnetic force. The boom 5, the arm 6, and the lifting magnet 7 are hydraulically driven by a boom cylinder 8, an arm cylinder 9, and a bucket cylinder 10, respectively. Furthermore, the turner 4 is provided with an operating chamber 4a for accommodating an operator that operates the position or an excitation operation or a release operation of the lifting magnet 7 or a power source such as an engine (internal combustion engine motor) 11 for generating hydraulic pressure. The engine 11 is constituted by, for example, a diesel engine.

Furthermore, the hybrid-type construction machine 1 includes a servo control unit 60. The servo control unit 60 controls the charging and the discharging of an AC motor for driving an operating element such as the turning mechanism 3 or the lifting magnet 7, or a motor generating for assisting the engine 11, and a storage battery (a battery). The servo control unit 60 includes an inverter unit for converting the DC electric power to the AC electric power to drive the AC motor or the electric generator, a plurality of driver units such as buck-boost converter units that control the charging and the discharging of the battery, and a control unit for controlling the plurality of driver units.

Figure 2:
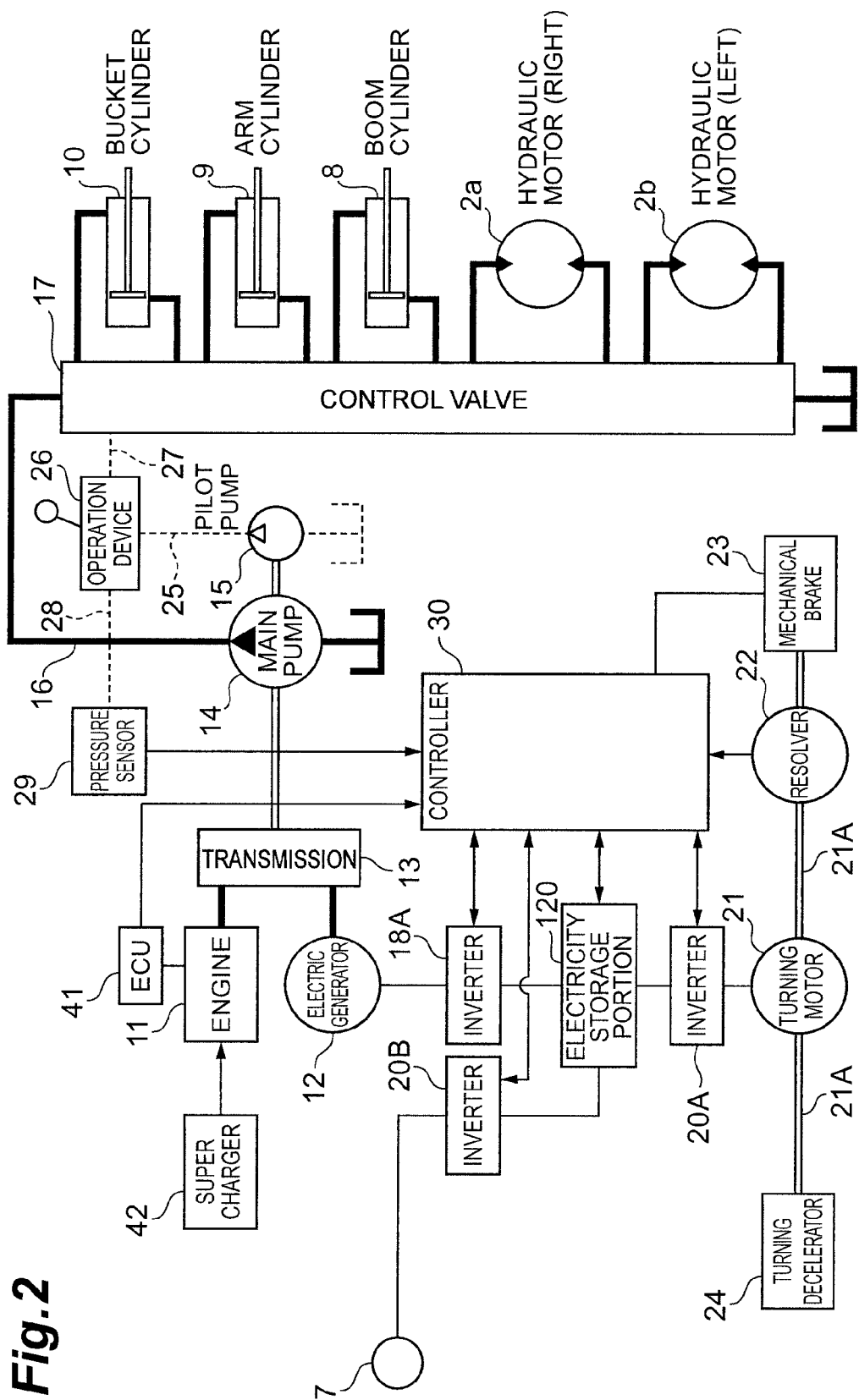
FIG. 2 is a block diagram that shows an internal configuration such as an electric system or a hydraulic system of the hybrid-type construction machine of the present embodiment.
Figure 3:
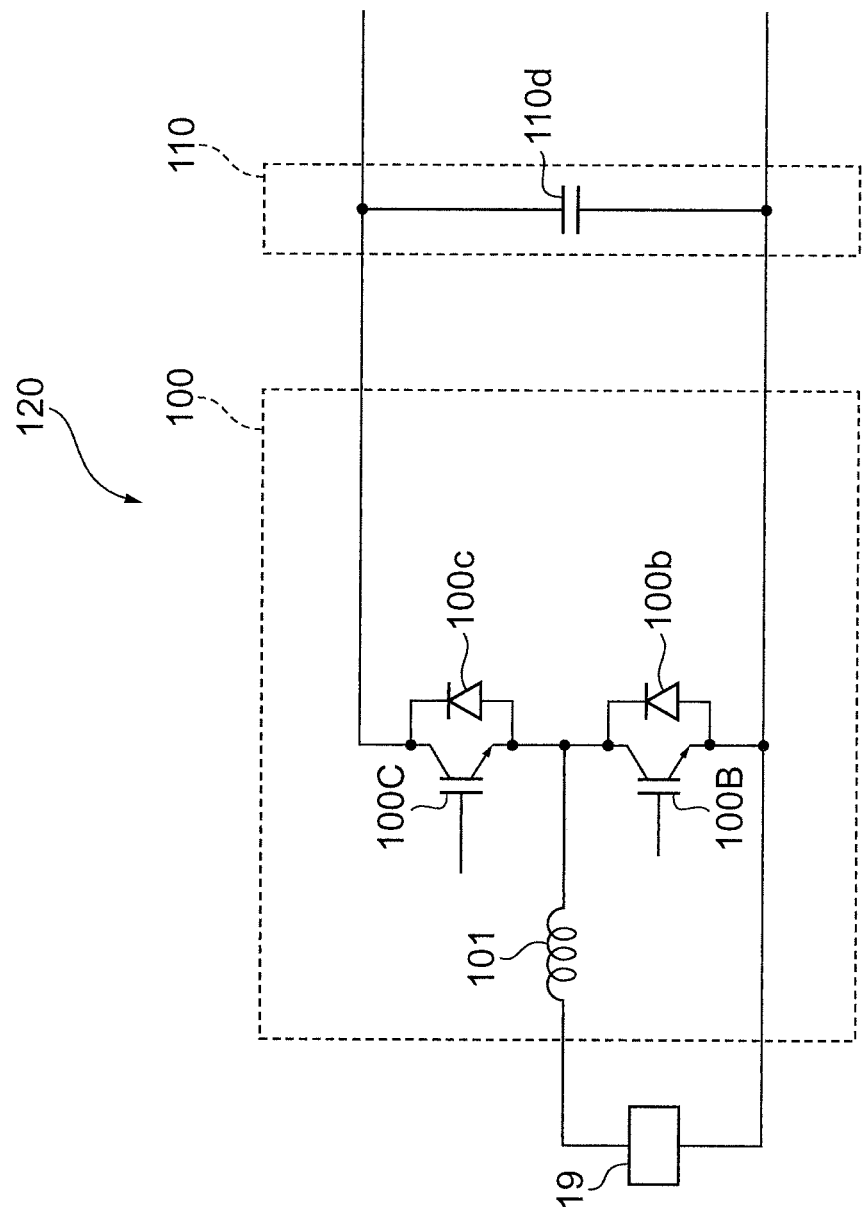
FIG. 3 is a diagram that shows an internal configuration of an electricity storage portion.

FIG. 2 is a block diagram that shows an internal configuration such as an electric system or a hydraulic system of the hybrid-type construction machine 1 of the present embodiment, In addition, in FIG. 2, a system for mechanically transmitting the power is indicated by double lines, a hydraulic system is indicated by a thick solid line, a steering system is indicated by dashed lines, and an electric system is indicated by a thin solid line, respectively. Furthermore, FIG. 3 is a diagram that shows an internal configuration of an electricity storage portion (electricity storage means) 120 in FIG. 2.

As shown in FIG. 2, the hybrid-type construction machine 1 includes a supercharger 42. The supercharger 42 is a device for supplying the engine 11 with compressed air. The supercharger 42 rotates a turbine at a high speed by the use of the pressure of the exhaust gas discharged from the engine 11, rotates a compressor directly connected to the turbine to compress the intake air, and supplies the intake air to the engine 11. As a result, the amount of suction air of the engine 11 is increased. In addition, the engine 11 is provided with an engine control unit (ECU) that controls the operation of the engine 11, and the ECU adjusts an output torque of the engine 11 based on the boost pressure of the supercharger 42 or the like.

Furthermore, the hybrid-type construction machine 1 includes an electric generator 12 and a transmission 13, and rotation shafts of the engine 11 and the electric generator 12 are connected to each other by being connected to an input shaft of the transmission 13. When the load of the engine 11 is high, the electric generator 12 drives the engine 11 as the operation element to aid (assist) the driving force of the engine 11, whereby the driving force of the electric generator 12 is transmitted to the main pump 14 via the output shaft of the transmission 13. Meanwhile, when the load of the engine 11 is low, the driving force of the engine 11 is transmitted to the electric generator 12 via the transmission 13, whereby the electric generator 12 performs electricity generation. The electric generator 12 is constituted by, for example, an IPM (Interior Permanent Magnetic) motor in which a magnet is embedded in an inner portion of a rotor. The conversion between the driving and the electricity generation of the electric generator 12 is performed by a controller 30 that performs the driving control of the electric system in the hybrid-type construction machine 1, depending on the load of the engine 11 or the like.

A main pump 14 and a pilot pump 15 are connected to the output shaft of the transmission 13, and a control valve 17 is connected to the main pump 14 via a high pressure hydraulic line 16. The control valve 17 is a device that performs the control of the hydraulic system in the hybrid-type construction machine 1. In addition to hydraulic motors 2a and 2b for driving a running mechanism 2 shown in FIG. 1, a boom cylinder 8, an arm cylinder 9, and a bucket cylinder 10 are connected to the control valve 17 via the high pressure hydraulic line, and the control valve 17 controls the hydraulic pressure to be supplied to that members depending on the operation input of a driver.

The output end of the inverter circuit 18A is connected to an electric terminal of the electric generator 12. An electricity storage portion 120 is connected to an input end of the inverter circuit 18A. As shown in FIG. 3, the electricity storage portion 120 includes a DC bus 110 as a DC mother line, a buck-boost converter (a DC voltage converter) 100 and a battery 19. That is, the input end of the inverter circuit 18A is connected to the input end of the buck-boost converter 100 via a DC bus 110. The battery 19, as a storage battery, is connected to the output end of the buck-boost converter 100. The battery 19 may be a capacitor such as an electric double layer capacitor without being limited to a secondary battery such as a lithium ion battery, and a nickel-hydrogen battery. The battery 19 of the present embodiment is constituted by, for example, a capacitor-type storage battery.

The inverter circuit 18A performs the driving control of the electric generator 12 based on the command from the controller 30. That is, when the inverter circuit 18A strenuously operates the electric generator 12, the required electric power is supplied from the battery 19 and the buck-boost converter 100 to the electric generator 12 via the DC bus 110. Furthermore, when regeneratively operating the electric generator 12, the electric power generated by the electric generator 12 is charged to the battery 19 via the DC bus 110 and the buck-boost converter 100. In addition, the switching control between the boost operation and the buck operation of the buck-boost converter 100 is performed by the controller 30 based on the DC bus battery value, the battery voltage value, and the battery current value. As a result, it is possible to maintain the DC bus 110 in the state of being accumulated to a predetermined fixed voltage.

In addition, the buck-boost converter 100 of the present embodiment includes a switching control mode, and has transistors 100B and 100C that are connected to each other in series, as shown in FIG. 3, a reactor 101 that is connected between the connection point and a positive side terminal of the battery 19, a diode that is connected to the transistor 100B in parallel in the reverse direction, a diode 100c that is connected to the transistor 100C in parallel in the reverse direction, and a smoothing condenser 110d. The transistors 100B and 100C are constituted by, for example, an IGBT (Insulated Gate Bipolar Transistor). When supplying the DC electric power from the battery 19 to the DC bus 110, a PWM voltage is applied to the gate of the transistor 100B by the command from the controller 30. Moreover, the induced electromotive force generated in the reactor 101 along with on/off of the transistor 100B is transmitted via the diode 100c, and the electric power is smoothed by the condenser 110d. Furthermore, when supplying the DC electric power from the DC bus 110 to the battery 19, the PWM voltage is applied to the gate of the transistor 100C by the command from the controller 30, and the current to be output from the transistor 100C is smoothed by the reactor 101.

When referring to FIG. 2 again, the lifting magnet 7 is connected to the electricity storage portion 120 via the inverter circuit 20B. The lifting magnet 7 includes an electromagnet that generates magnetic force for magnetically adsorbing the metallic matter and the electric power is supplied from the electricity storage portion 120 via the inverter circuit 20B. The inverter circuit 20B supplies the request electric power to the lifting magnet 7 from the electricity storage portion 120 when turning the electromagnet on based on the command from the controller 30. Furthermore, when turning the electromagnet off, the regenerated electric power to the electricity storage portion 120.

Furthermore, the inverter circuit 20A is connected to the electricity storage portion 120. A turning motor (an AC motor) 21 as a working motor is connected to an end of the inverter circuit 20A, and the other end of the inverter circuit 20A is connected to the DC bus 110 of the electricity storage portion 120. The turning motor 21 is a power source of the turning mechanism 3 that turns the turner 4. A resolver 22, a mechanical brake 23, and a turning decelerator 24 are connected to the rotation shaft 21A of the turning motor 21.

When the turning motor 21 performs the exertion running, the rotational force of the rotational driving force of the turning motor 21 is amplified by the turning decelerator 24, the acceleration and the deceleration of the turner 4 are controlled, and the turner 4 performs the rotational movement. Furthermore, the revolution is increased in the turning decelerator 24 by the inertial rotation of the turner 4, whereby the revolution is transmitted to the turning motor 21 to generate the regenerative electric power. The turning motor 21 is subjected to the AC driving through the inverter circuit 20A by a PWM (Pulse Width Modulation) control signal. As the turning motor 21, for example, an IPM motor embedded with a magnet is preferable.

The resolver 22 is a sensor that detects a rotation position and a rotation angle of the rotation shaft 21A of the turning motor 21, and detects the rotation angle and the rotation direction of the rotation shaft 21A by being mechanically connected to the turning motor 21. The resolver 22 detects the rotation angle of the rotation shaft 21A, whereby the rotation angle and the rotation direction of the turning mechanism 3 are derived. The mechanical brake 23 is a brake device that generates the mechanical braking force, and mechanically stops the rotation shaft 21A of the turning motor 21 by the command from the controller 30. The turning decelerator 24 is a decelerator that decelerates the rotation speed of the rotation shaft 21A of the turning motor 21 and mechanically transmits the rotation speed to the turning mechanism 3.

In addition, since the electric generator 12, the turning motor 21, and the lifting magnet 7 are connected to the DC bus 110 via the inverter circuits 18A, 20A, and 20B, in some cases, the electric power generated by the electric generator 12 may directly be supplied to the lifting magnet 7 or the turning motor 21, the electric power regenerated by the lifting magnet 7 may supplied to the electric generator 12 or the turning motor 21, and the electric power regenerated by the turning motor 21 may be supplied to the electric generator 12 or the lifting magnet 7.

An operation device 26 is connected to the pilot pump 15 via a pilot line 25. The operation device 26 is an operation device for operating the turning motor 21, the running mechanism 2, the boom 5, the arm 6, and the lifting magnet 7, and is operated by an operator. The control valve 17 is connected to the operation device 26 via the hydraulic line 27 and the pressure sensor 29 is connected to the hydraulic line 26 via the hydraulic line 28. The operation device 26 converts the hydraulic pressure (the hydraulic pressure of a primary side) to be supplied through the pilot line 25 to the hydraulic pressure (the hydraulic pressure of a secondary side) depending on an amount of operation of an operator and outputs the converted hydraulic pressure. The hydraulic pressure of the secondary side to be output from the operation device 26 is supplied to the control valve 17 through the hydraulic line 27 and is detected by the pressure sensor 29. Herein, the turning motor 21 is adopted as the working motor, but the running mechanism 2 may be electrically driven as the working motor. Furthermore, when the hybrid-type working machine is a forklift, the lifting device may be driven electrically as the working motor. Furthermore, when the hybrid-type working machine is a foil loader or a bulldozer, left and right running hydraulic motors for driving the driving wheels as running mechanisms may be replaced with the working motor. In this case, the arm cylinder 9 in FIG. 2 can be replaced with the wheel loader or the lifting device of the bulldozer. Furthermore, the boom cylinder 8 and the hydraulic motors 2a and 2b may be omitted.

When an operation for turning the turning mechanism 3 is input to the operation device 26, the pressure sensor 29 detects the operation amount as a change in hydraulic pressure within the hydraulic line 28. The pressure sensor 29 outputs the electric signal that shows the hydraulic pressure within the hydraulic line 28. The electric signal is input to the controller 30 and is used in the driving control of the turning motor 21.

The controller 30 constitutes a control portion in the present embodiment. The controller 30 is constituted by a calculation processing device that includes a CPU and an internal memory, and is realized by the execution of the driving control program stored in the internal memory by the CPU. Furthermore, the electric power source of the controller 30 is a battery (for example, a 25 V automotive battery) different from the battery 19. The controller 30 converts the signal indicating the operation amount for turning the turning mechanism 3 among the signal to be input from the pressure sensor 29 into a speed command, thereby performing the driving control of the turning motor 21. Furthermore, the controller 30 performs the operation control of the electric generator 12 the switch-over of an assist operation and an electricity generation operation), the driving control (the switch-over of the excitation and the demagnetization) of the lifting magnet 7, and the charging and discharging control of the battery 19 by the driving control of the buck-boost converter 100.

Figure 4:
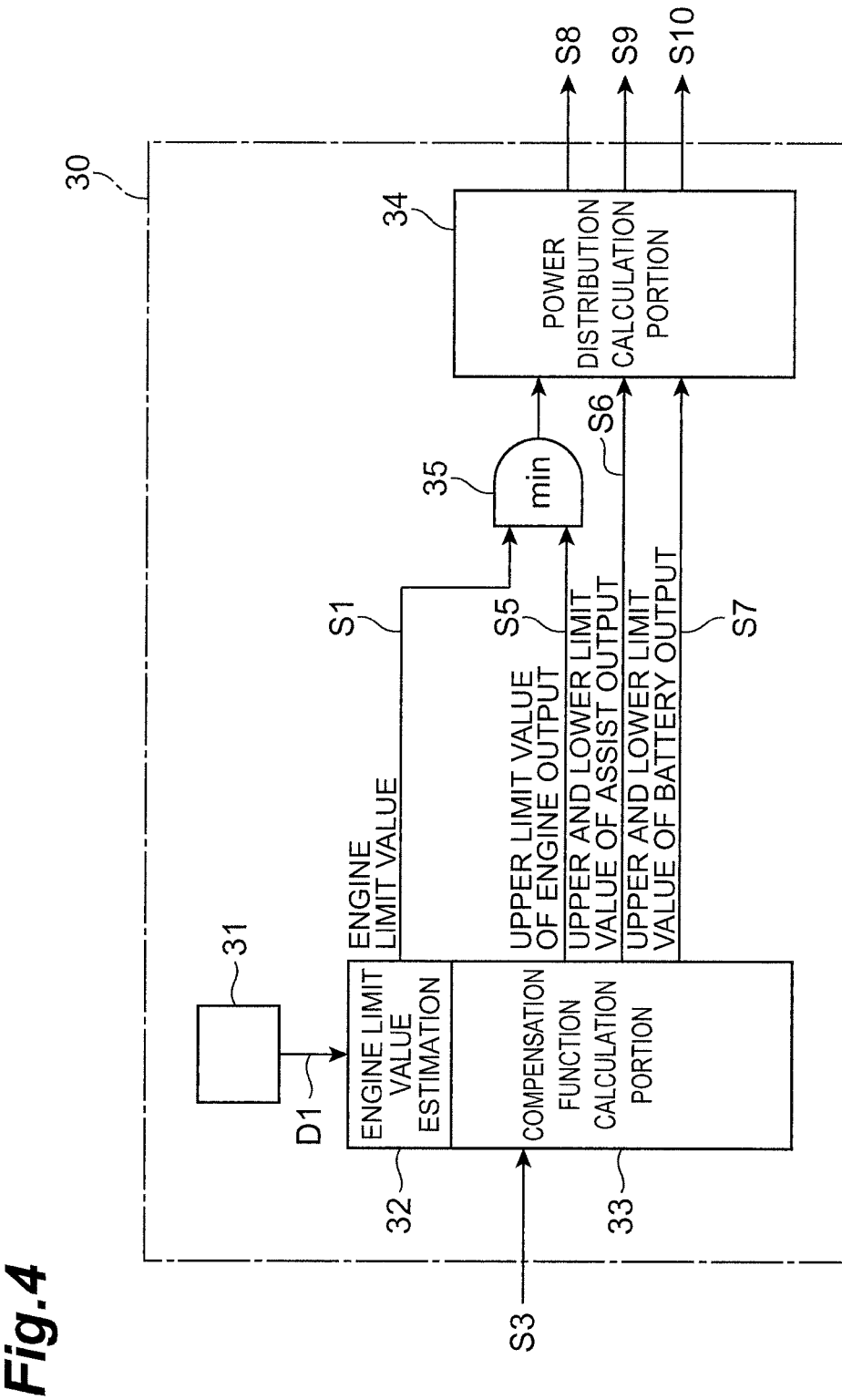
FIG. 4 is a diagram that shows an internal configuration of a controller.

FIG. 4 is a block diagram that shows an internal configuration of the controller 30. The controller 30 of the present embodiment has a nonvolatile memory 31, an engine limit value estimation portion 32, a compensation function calculation portion 33, a power distribution calculation portion 34, and a signal selection portion 35.

Figure 5:
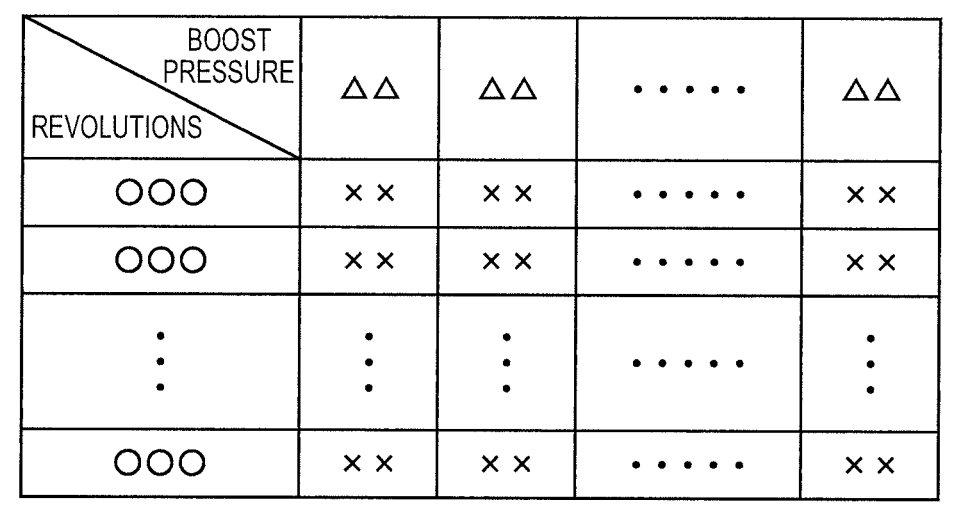

The nonvolatile memory 31 is a memory portion (memory means) in the present embodiment. The nonvolatile memory 31 stores an engine limit table (first information) D1 that indicates a correlation between the revolutions of the engine 11, the boost pressure (the supercharging pressure) of the supercharger 42, and the upper limit value of the output of the engine 11 in advance. For example, as shown in FIG. 5, the engine limit table D1 has a configuration in which the upper limit of the output of the engine 11 is stored in each element of a two-dimensional array that is formed of a row corresponding to a plurality of values concerning the revolutions of the engine 11 and a column corresponding to a plurality of values concerning the boost pressure of the supercharger 42. In addition, as the memory portion in the present invention, another member may be used if it can statically hold the memory without being limited to the nonvolatile memory 31.

Figure 6:
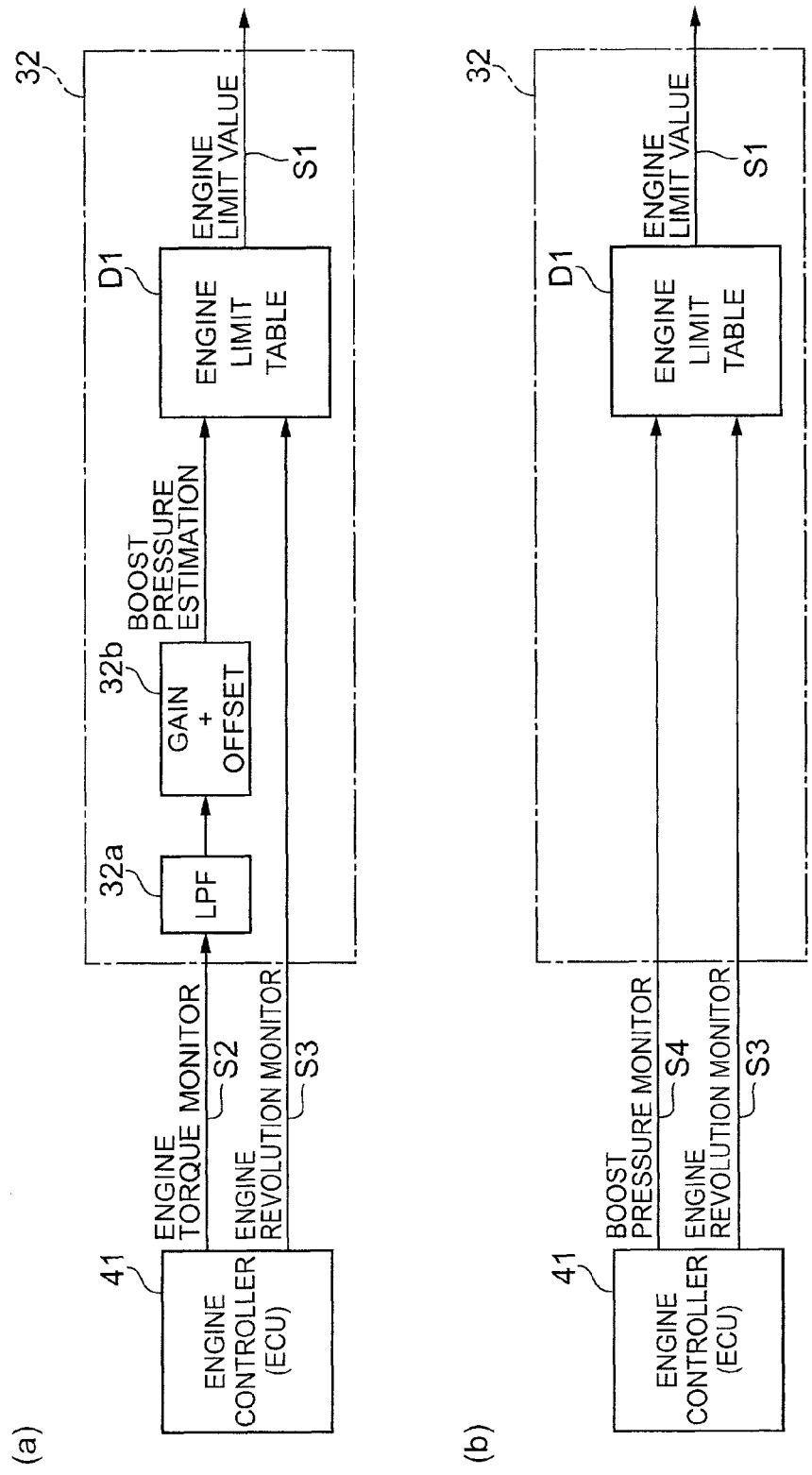
FIG. 6A shows an example of an internal configuration of an engine limit amount estimation portion.
FIG. 6B shows another example of an internal configuration of an engine limit amount estimation portion.

The engine limit value estimation portion 32 creates a signal S1 indicating the upper limit (that is, the engine limit value) of the output value of the engine 11 based on the engine limit table D1 stored in the nonvolatile memory 31. Herein, FIGS. 6A and 6B are block diagrams for describing an internal configuration of the engine limit amount estimation portion 32. FIG. 6A shows an example of an internal configuration of the engine limit amount estimation portion 32, and FIG. 6B shows another example of an internal configuration of the engine limit amount estimation portion 32.

In the configuration shown in FIG. 6A, the engine limit amount estimation portion 32 acquires an engine torque monitor signal S2 and an engine revolution monitor signal S3 that are provided from the ECU 41 of the engine 11. The engine torque monitor signal S2 is a signal that shows the current output torque of the engine 11, and the engine torque monitor signal S3 is a signal that shows the current revolutions of the engine 11. Moreover, the engine limit amount estimation portion 32 estimates the boost pressure of the supercharger 42 from the engine torque monitor signal S2, applies the magnitude of the estimated boost pressure and the revolutions of the engine 11 indicated in the engine revolution monitor signal S3 to the engine limit table D1, and outputs the derived output upper limit value of the engine 11 as the signal S1.

Figure 7:
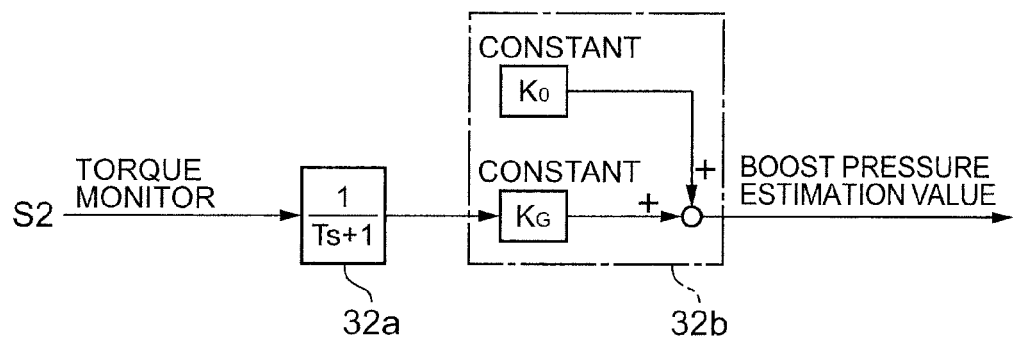
FIG. 7 is a diagram that shows a configuration example for calculating a boost pressure estimation value.

In addition, as shown in FIG. 6A, the configuration for estimating the boost pressure of the supercharger 42 is preferably obtained by a low pass filter 32a, and a calculator 32b including a gain and an offset. Specifically, as shown in FIG. 7, the boost estimation value may be calculated by inputting the engine torque monitor signal S2 to the low pass filter 32a of a time constant T, multiplying the signal filtered by the low pass filter 32a by a constant gain $K_G$ and adding the constant $K_O$ to that value.

Furthermore, in the configuration shown in FIG. 6B, the engine limit amount estimation portion 32 acquires the boost pressure monitor signal S4 instead of the engine torque monitor signal S2 mentioned above from the ECU 41. The boost pressure monitor signal S4 is a signal that is output by the detection of the boost pressure of the supercharger 42 through the ECU 41. Moreover, the engine limit amount estimation portion 32 applies the magnitude of the boost pressure indicated in the boost pressure monitor signal S4 and the revolutions of the engine 11 indicated in the engine revolution monitor signal S3 to the engine limit table D1 and outputs the derived output upper limit value of the engine 11 as the signal S1. In addition, in many cases, the sampling cycle of the boost pressure monitor signal S4 to be provided from the ECU 41 is extremely slow, for example, 500 milliseconds. In this manner, when the sampling period of the boost pressure monitor signal S4 is long, it is preferable that the engine limit amount estimation portion 32 have the configuration shown in FIG. 6A.

Figure 8:
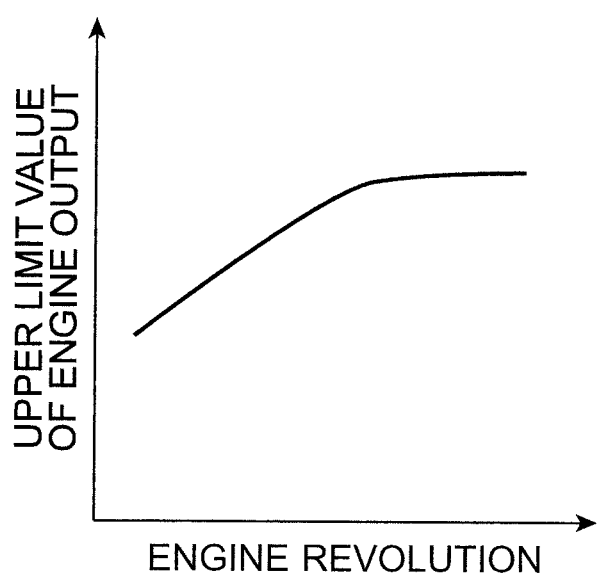
FIG. 8 shows a case where a sufficient boost pressure depending on the revolutions is obtained in regard to a correlation between the revolution of an engine and an engine output in a steady state.

The configuration of the controller 30 will be described again with reference to FIG. 4. The compensation function calculation portion 33 creates a signal S5 that indicates an upper limit value and a lower limit value of the output of the engine 11, a signal S6 that indicates the assist output (that is, an upper limit value and a lower limit value of the output of the electric generator 12), and a signal S7 that indicates an upper limit value and a lower limit value of the output (the electric power) of the battery 19, based on the engine revolution monitor signal S3 that is provided form the ECU 41, the terminal voltage of the battery 19 or the like. In addition, the compensation function calculation portion 33 outputs the rated value corresponding to the revolutions of the engine 11 as the upper limit value of the output of the engine 11, for example, based on the correlation shown in FIG. 8. FIG. 8 shows a case where the sufficient boost pressure depending on the revolutions in regard to the correlation between the revolution and the output of the engine 11 in the steady state. Information (second information) on the maximum output value depending on the revolutions of the engine 11 as shown in FIG. 8 is stored in the nonvolatile memory 31 as the memory portion in advance.

The signal S1 output from the engine limit amount estimation portion 32 and the signal S5 output from the compensation function calculation portion 33 are input to the signal selection portion 35. The signal selection portion 35 selects the small part among the upper limit values of the output of the engine 11 shown in the signals S1 and S5 and outputs the signals.

In addition, in the present embodiment, the configuration is adopted in which the signal selection portion 35 receives the signal S1 and S5 to perform the selection, but, for example, the engine limit amount estimation portion 32 may receive the signal output from the compensation function calculation portion 33 and output a smaller one compared to the upper limit value of the output of the engine 11 calculated in the engine limit amount estimation portion 32 from the engine limit amount estimation portion 32. Otherwise, the compensation function calculation portion 33 may receive the signal output from the engine limit amount estimation portion 32 and output a smaller one compared to the upper limit value of the output of the engine 11 calculated in the compensation function calculation portion 33 from the compensation function calculation portion 33.

The power distribution calculation portion 34 receives the signal (that is, the upper limit value of the output of the engine 11) output from the signal selection portion 35 and the signals S6 and S7 output from the compensation function calculation portion 33, creates a signal S8 indicating the upper limit value of the hydraulic load output in the main pump 14, a signal S9 that shows the upper limit value of the electric load output (the turning motor 21, the lifting magnet 7 or the like), and a signal S10 indicating the output command value of the moor generator 12, and outputs the signals S8 to S10 to each portion of the controller 30. The controller 30 controls the inverter circuits 18A, 20A, and 20B and the buck-boost converter 100 based on the signals S8 to S10. Particularly, concerning the control of the inverter circuit 18A, when the output required for the main pump 14 exceeds the upper limit value of the output of the engine 11, the control is performed such that the electric generator 12 assists the driving force of the engine 11. Furthermore, when the output required for the main pump 14 is lower than the upper limit value of the output of the engine 11, the control is performed so as to perform electricity generation in the electric generator 12 the driving force of the engine 11.

Before describing the operation of the hybrid-type construction machine 1 of the present embodiment having the configuration mentioned above, the operation and the problem of the hybrid-type working machine of the related art will be described. FIG. 9 is a graph for describing the operation of the hybrid-type working machine of the related art. The graph G11 shown in FIG. 9A shows the rated output (that is, the engine output upper limit value S5 that is calculated from the compensation function calculation portion 33), the graph G12 shows the output that can be realized by the engine 11, and the graph G13 shows the request output of the main pump 14. Furthermore, the graph G14 shown in FIG. 9B shows the actual revolutions of the engine 11, and the graph G15 shows the actual boost pressure of the supercharger 42.

Now, at a time $t_1$, for example, the hydraulic pressure required for the main pump 14 is increased, and the driving force to be supplied to the main pump 14 is increased from P1 kW to P2 kW (for example, 70 kW). At this time, as shown in the graph G14, since the revolutions of the engine 11 are sufficiently high at the time $t_1$, the rated output to be calculated from the revolution thereof becomes higher than P2 kW (the graph G11). Thus, for example, at a time $t_2$, the upper limit value of the output of the engine 11 is recognized as U1 (>P2) kW (for example, 95 kW). That is, it is decided that the driving aid (the assist) by the electric generator 12 to the engine 11 is unnecessary, and (U1−P2) kW (25 kW) as a surplus output is used in the electricity generation by the electric generator 12.

However, when the supercharger 42 is provided in the engine 11, the output of the engine 11 is greatly influenced by the boost pressure. Since there is a tendency for the boost pressure to increase due to the time delay from an increase in output of the engine 11, even when the output of the engine 11 is increased, the time delay is generated until a normal output corresponding to the output is obtained. Thus, as shown in the graph G15, when the boost pressure of the supercharger 42 is not yet sufficient, the actual output (the graph G12) of the engine 11 becomes E (<P2) kW (for example, 40 kW) at the time $t_2$. As a result, the output of the engine 11 is insufficient to U1 kW, which is a sum of the request output P2 kW of the main pump 14 and the output (U1−P2) kW to the electric generator 12, by (U1−E) kW. Thus, the engine 11 becomes overloaded, and the revolutions of the engine 11 drop like the graph G14, whereby the engine 11 may be stopped.

In regard to the problem, the hybrid-type construction machine 1 of the present embodiment is operated as below. FIGS. 10A and 10B are graphs for describing the operation of the hybrid-type construction machine 1. The graph G21 shown in FIG. 10A shows the rated output (that is, the engine output upper limit value S5 that is calculated from the compensation function calculation portion 33), the graph G22 shows the output that can be realized by the engine 11, the graph G23 shows the request output of the main pump 14, and the graph G26 shows the upper limit (that is, the engine limit value S1 that is calculated in the engine limit amount estimation portion 32) of the output of the engine 11 considering the boost pressure. Furthermore, the graph G24 shown in FIG. 10B shows the actual revolutions of the engine 11, and the graph G25 shows the actual boost pressure of the supercharger 42.

At the time $t_1$, the driving force to be supplied to the main pump 14 is increased from P1 kW to P2 kW. At this time the revolution (the graph G24) of the engine 11 at the time $t_1$ is sufficiently high. However, since the boost pressure (the graph G25) of the supercharger 42 is still low, in the engine limit amount estimation portion 32, the output upper limit value depending on the low boost pressure is selected from the engine limit table D1 (the graph G26). Thus, for example, at the time $t_2$, the upper limit value of the output of the engine 11 is set to U2 ($\cong$E) kW, and the remaining request output (P2−U2) kW is obtained by the assist from the electric generator 12. As a result, the engine 11 does not become overloaded, and it is possible to suppress a drop in revolutions of the engine 11 like the graph G24. In the embodiment of FIG. 10, at a time $t_3$, the driving force P2 to be supplied to the main pump 14 can be met only by the output of the engine 11.

Herein, if the driving force P2 is greater than the rated output (G21), the output of the engine 11 is increased according to the output upper limit (G26) of the engine 11 considering the boost pressure, and after a time $t_4$ when the G21 and the G26 intersect with each other, the output of the engine 11 becomes a value according to the rated output (G21). In this case, it is possible to supplement the insufficient driving force with the assist from the electric generator 12 to the time $t_4$.

As described above, in the hybrid-type construction machine 1 of the present embodiment, the correlation (see FIG. 5) between the revolutions of the engine 11, the boost pressure of the supercharger 42, and the output upper limit value of the engine 11 is stored in the nonvolatile memory 31, and the controller 30 controls the electric generator 12 based on the correlation. As a result, since the output upper limit value of the engine 11 is suppressed when the boost pressure is low even if the revolutions of the engine 11 are increased, the controller 30 can cause the electric generator 12 to perform the suitable assist. Thus, according to the hybrid-type construction machine 1 of the present embodiment, overloading of the engine 11 can effectively be suppressed. In addition, the power distribution calculation portion 34 of the present embodiment can be omitted, and even in such a case, the engine output can be reduced by the control of the controller 30. In that case, the controller 30 controls the output Wa (the assist state is set to a positive value) of the electric generator 12 so as to be identical to the difference between the output Wp of the main pump 14 and the output We of the engine 11 (Wa=Wp−We). Even in such a control mode, according to the present embodiment, the engine output We is suppressed based on the output upper limit value (the graph G26 of FIG. 10A) selected from the engine limit table. In this manner, the engine output We is reduced, whereby the controller 30 controls the inverter 18A such that the output Wa of the electric generator 12 is increased according to the correlation of Wa=Wp−We.

Second Embodiment

Herein, another problem of the hybrid-type working machine will be described. FIG. 11A is a graph that shows time changes of each of an output (a graph G31) of the engine 11, an output (a graph G32) of the electric generator (the assist motor), a hydraulic output (a graph G33) from the main pump 14, and the revolution (a graph G34) of the engine 11. In FIG. 11A, a left vertical axis indicates the output (kW), a right vertical axis indicates the revolution (rpm), and a horizontal axis indicates the time (second), respectively. Furthermore, FIG. 11B is a graph that shows a time change of the boost pressure (the supercharging pressure). In FIG. 11B, a vertical axis indicates the boost pressure (kPa) and a horizontal axis indicates the time (second).

In FIGS. 11A and 11B, at the time when the time elapses by t1 second, the load is applied to the hydraulic system, and the driving force to be supplied to the main pump 14 is increased from Pa (kW) to Pb (kW). As a result, the engine revolution temporarily drops, and the boost pressure is low. However, the request output is obtained by the assist from the electric generator 12, whereby the revolutions of the engine 11 are stabilized based on the boundary of some timing, the boost pressure is gradually increased along with this, and the output of the engine 11 is increased. Moreover, the output of the electric generator 12 is gradually suppressed along with an increase in output of the engine 11.

However, as shown in FIG. 11A, even when the output of the engine 11 is increased, the output from the electric generator 12 does not become 0 kW but is developed while maintaining a certain value. That is, a part of the driving force to be supplied to the main pump 14 is continuously supplied from the electric generator 12. When a long time elapses in this state, there is a concern that the electric power accumulated in the battery 19 may be exhausted.

Figure 12:
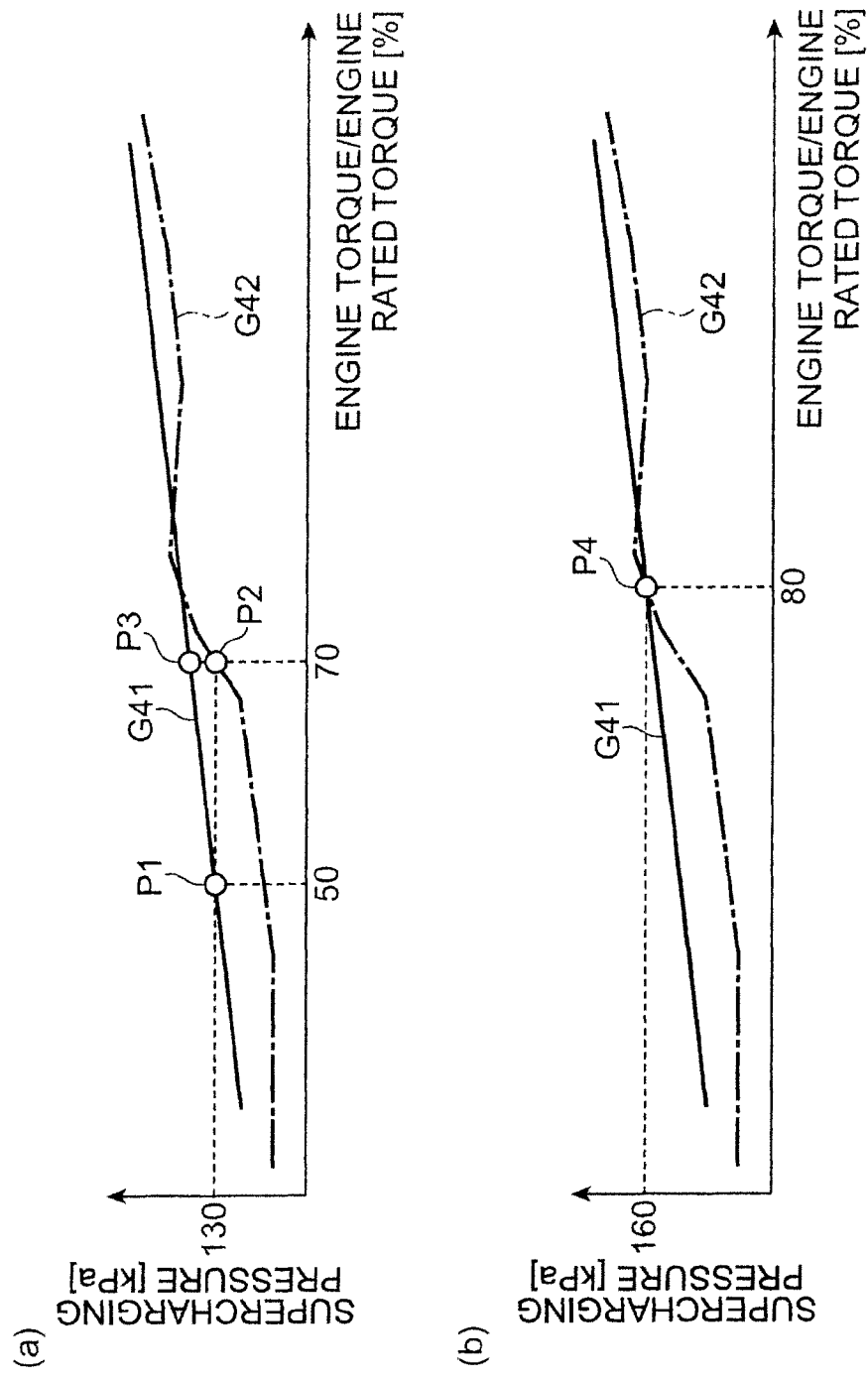
FIGS. 12A and 12B are graphs in which a graph G41 shows an example of a correlation between the maximum boost pressure of the supercharger depending on a fuel supply amount to the engine and the revolutions of the engine and an engine torque, and a graph G42 shows an example of a correlation between a limit value of the engine torque corresponding to the output upper limit value of the engine and a boost pressure of the supercharger corresponding to the output upper limit value stored in an engine limit table stored in a nonvolatile memory.

FIG. 12 is a graph for describing a factor in which such a phenomenon is generated. In FIGS. 12A and 12B, a graph G41 is a graph that shows an example of a correlation between the maximum boost pressure (kPa) of the supercharger 42 depending on the fuel supply amount to the engine 11 and the revolutions of the engine 11 and the engine torque. Furthermore, a graph G42 is a graph that shows an example of a correlation between the limit value of the engine torque corresponding to the output upper limit value of the engine 11 and the boost pressure (kPa) of the supercharger 42 corresponding to the output upper limit value which is stored in the engine limit table D1 (see FIG. 5) stored in the nonvolatile memory 31. In FIGS. 12A and 12B, the vertical axis indicates the boost pressure (kPa) and the horizontal axis indicates a ratio (hereinafter, referred to as an engine torque ratio) between the engine torque required for the load and the engine rated torque. Herein, the engine torque can be converted to the fuel flow rate or the engine output of the engine 11 per unit time.

Now, as shown by a point P1 in FIG. 12A, the torque ratio is 500%. In this case, the maximum boost pressure of the supercharger 42 is 130 kPa. That is, when the revolutions of the engine 11 are stabilized, the supercharger 42 outputs the boost pressure of 130 kPa in the steady state. Moreover, in this case, even in the limitation by the engine limit table D1, it is possible to increase the fuel flow rate up to the engine torque ratio of 70% under the same supercharging pressure of 130 kPa according to the graph G42. When increasing the fuel flow rate (a point P2 in FIG. 12A) up to the engine torque ratio of 70%, the output of the engine 11 is gradually increased and the exhaust pressure is increased, whereby the supercharging pressure further rises (a point P3 in FIG. 12A). As a result, it is possible to cope with a further rise in engine torque request.

However, like the examples shown in FIGS. 12A and 12B, when the graph G41 and the graph G42 intersect with each other, the problem as below is generated. Now, as shown by a point P4 in FIG. 12B, the engine torque ratio is 80%. In this case, the maximum boost pressure of the supercharger 42 is 160 kPa. That is, when the revolutions of the engine 11 are stabilized, the supercharger 42 outputs the boost pressure of 160 kPa in the steady state. However, when the engine torque ratio is equal to or greater than 80%, the maximum boost pressure G41 becomes smaller than the boost pressure G42 corresponding to the output upper limit value. In this case, it is impossible to increase the engine torque ratio than 80% under the supercharging pressure of 160 kPa in the limitation by the engine limit table D1. As a consequence, as shown in the graph G32 of FIG. 11, a situation arises where there is a need to supplement the output of the engine 11 to successively supply a part of the driving force of the main pump 14 from the electric generator 12. In the working machine, since it is common to perform the working whole suppressing the revolutions of the engine 11 to the minimum, such a situation easily arises.

Figure 13:
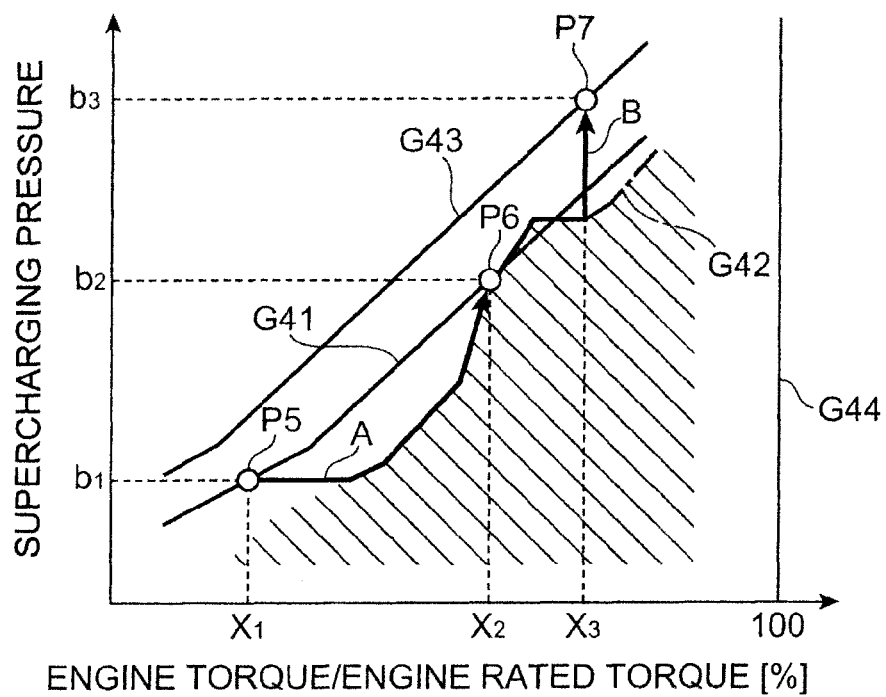
FIG. 13 is a graph for describing a method of solving the problem of the hybrid-type working machine that schematically shows the graphs G41 and G42 shown in FIG. 12.

FIG. 13 is a graph for describing a method for solving the problem. FIG. 13 schematically shows the graphs G41 and G42 shown in FIGS. 12A and 12B. In FIG. 13, a vertical axis indicates the boost pressure and a horizontal axis indicates the engine torque ratio. Now, the engine torque ratio is $x_1$ (%) and the boost pressure is $b_1$ (a point P5 in FIG. 13). When the hydraulic load is applied, in the case of trying to increasing the engine torque ratio from this to $x_2$ (%) (however, $x_2 > x_1$), the engine torque command and the supercharging pressure reach the engine torque ratio $x_2$ (%) and the boost pressure $b_2$ (however, $b_2 > b_1$) along the path such as a solid line A in FIG. 13 according to the output upper limit value selected from the engine limit table D1 by the monitored engine revolution S3 and the estimated boost pressure ($b_1$) under the limitation by the engine limit table D1 (a point P6 in FIG. 13). In addition, at this time, when the output of the engine 11 is insufficient, a part of the driving force from the electric generator 12 is aided (a diagonal region in FIG. 13).

However, the point P6 having the engine torque ratio $x_2$ (%) and the boost pressure $b_2$ is present on the graph G42, the boost pressure $b_2$ becomes the maximum boost pressure of the supercharger 42 in the current revolution, whereby it is difficult to further increase the engine torque ratio in this state.

Thus, in the present embodiment, by increasing the revolutions of the engine 11 by the use of the driving force from the electric generator 12, the fuel supply amount to the engine 11 and the maximum boost pressure of the supercharger 42 depending on the revolutions of the engine 11 are increased. As a result, the graph G41 in FIG. 13 is translated to the graph G43 and can reach the engine torque ratio $x_3$ (%) (however, $x_3 > x_2$) and the boost pressure $b_3$ ($b_3 > b_2$) along the path such as a solid line B in FIG. 13 (a point P7 in FIG. 13). In addition, for example, the revolutions of the engine 11 corresponding to the graph G41 is 1,500 rpm, and the revolution corresponding to the graph G43 is 2,000 rpm. Herein, the graph G44 shows the engine rated torque (the engine torque ratio 100%) in which the engine revolution is in the same condition as the graph G41.

Figure 14:
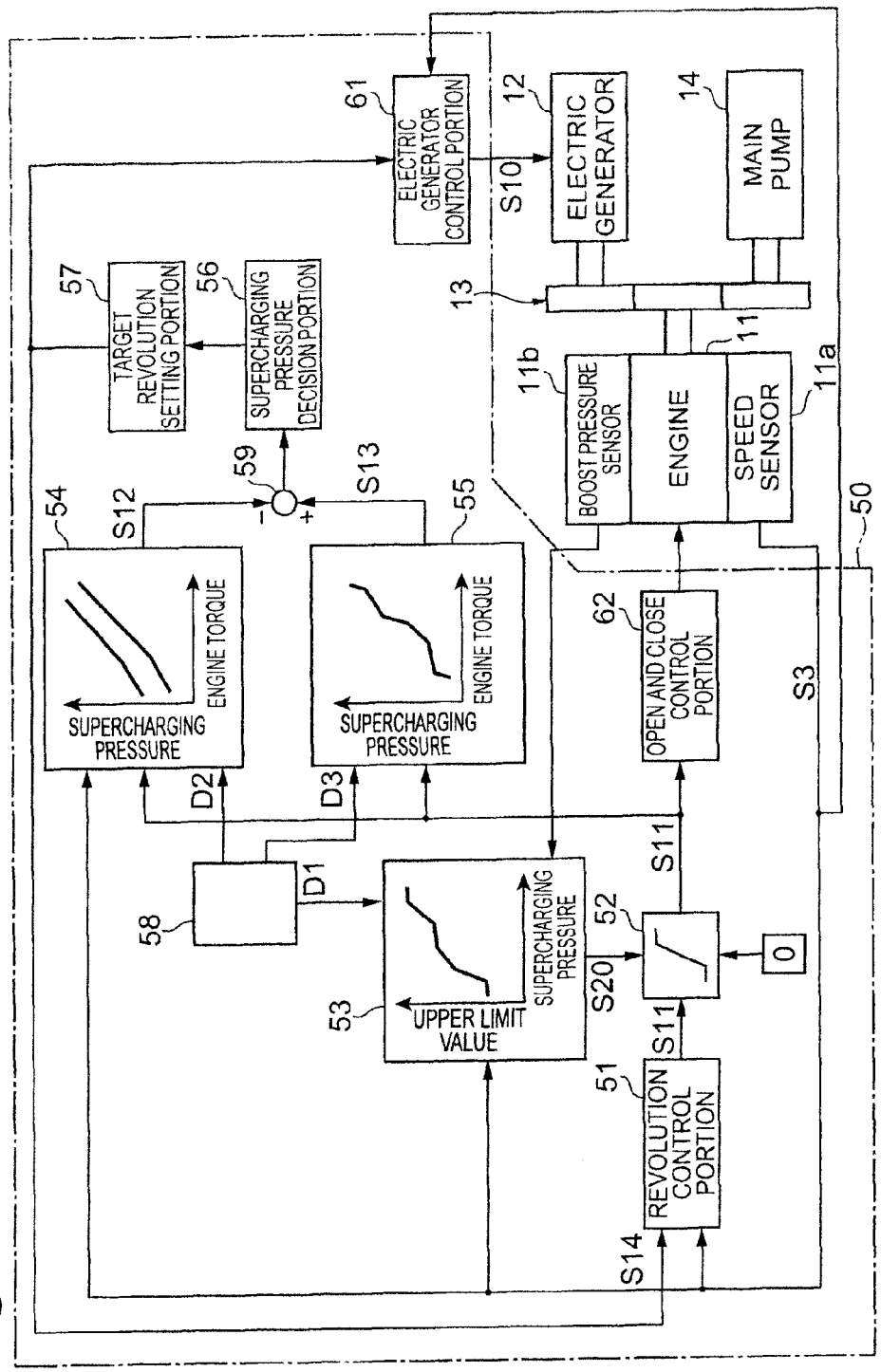
FIG. 14 is a block diagram that shows a specific configuration of a second embodiment.

FIG. 14 is a block diagram that shows a specific configuration for realizing such a mode. As shown in FIG. 14, the controller 50 of the present embodiment has a configuration in addition to the configuration of the controller 30 of the first embodiment. That is, the controller 50 has a revolution control portion 51, a limiter portion 52, an output upper limit conversion portion 53, a first supercharging pressure calculation portion 54, a second supercharging pressure calculation portion 55, a supercharging pressure decision portion 56, a target revolution setting portion 57, a nonvolatile memory 58, and an electric generator 61.

The revolution control portion 51 is a portion for controlling the revolutions of the engine 11. A signal (the engine revolution monitor signal S3) indicating the current revolution is input from the speed sensor 11a to the revolution control portion 51, and the engine revolution command signal S14 indicating the target revolution is input from the target revolution setting portion 57 to the revolution control portion 51. The revolution control portion 51 creates the engine torque command signal S11 such that the difference between the current revolution and the target revolution becomes close to zero. The engine torque command signal S11 is sent to an open and close control portion 62 via a limiter portion 52. The open and close control portion 62 sends the open and close signal depending on the engine torque command signal S11, and controls the fuel flow rate per unit time of the engine 11.

The limiter portion 52 is a portion for limiting the engine torque command signal S11 that is sent from the revolution control portion 51 to the open and close portion 62. The limiter portion 52 limits the engine torque command signal S11 to a value corresponding to the output upper limit value of the engine 11 that is provided from an output upper limit conversion portion 53.

The output upper limit conversion portion 53 is a portion for obtaining the output upper limit value of the engine 11 based on the revolutions of the engine 11 and the boost pressure of the supercharger 42. The output upper limit conversion portion 53 is equivalent to the engine limit value estimation portion 32 in the first embodiment. That is, the output upper limit conversion portion 53 creates a signal S20 indicating the upper limit (that is, the engine limit value) of the output value of the engine 11, based on the engine limit table D1 (see FIG. 5) stored in the nonvolatile memory 58 that is the memory portion in the present embodiment. In addition, the engine limit table is first information in the present embodiment, and indicates a correlation between the revolutions of the engine 11, the boost pressure of the supercharger 42, and the output upper limit value of the engine 11.

The output upper limit conversion portion 53 acquires the boost pressure monitor signal from the boost pressure sensor 11b. The boost pressure monitor signal is a signal that is output by the detection of the boost pressure of the supercharger 42 by the boost pressure sensor 11b. Furthermore, the output upper limit conversion portion 53 acquires the engine revolution monitor signal S3 form the speed sensor 11a. The output upper limit conversion portion 53 acquires the engine revolution monitor signal S3 from the speed sensor 11a. The output upper limit conversion portion 53 applies the magnitude of the boost pressure shown in the boost pressure monitor signal and the revolutions of the engine 11 indicated in the engine revolution monitor signal S3 to the engine limit table D1 (see FIG. 5) and outputs the signal S20 concerning the derived output upper limit value of the engine 11 to the limiter portion 52.

In addition, in the present embodiment, the output upper limit conversion portion 53 obtains the boost pressure monitor signal from the boost pressure sensor 11b, but, as described in the first embodiment, the output upper limit conversion portion 53 may estimate the boost pressure of the supercharger 42 from the engine torque monitor signal. A preferable configuration for estimating the boost pressure of the supercharger 42 is as shown in FIG. 6A.

The first supercharging pressure calculation portion 54 is a portion for obtaining the maximum boost pressure of the supercharger 42 depending on the fuel supply amount to the engine 11 and the revolutions of the engine 11. The correlation between the maximum boost pressure, the fuel supply amount to the engine 11, and the revolutions of the engine 11 is stored in the nonvolatile memory 58 as the maximum boost pressure table D2. The maximum boost pressure table D2 is third information in the present embodiment. In the maximum boost pressure table D2, the maximum boost pressure is monotonously increased with respect to the fuel supply amount to the engine 11, but even when the fuel supply amount is identical, the greater the revolutions of the engine 11 are, the higher the maximum boost pressure is. In addition, the graphs G41 or the graph G43 as shown in FIG. 13 is consistent with one in which the maximum boost pressure table D2 is indicated as a graph.

The first supercharging pressure calculation portion 54 acquires the engine revolution monitor signal S3 from the speed sensor 11*a* so as to detect the revolutions of the engine 11. Furthermore, the first supercharging pressure calculation portion 54 acquires the engine torque command signal S11 that is output from the limiter portion 52 so as to detect the fuel supply amount to the engine 11. The first supercharging pressure calculation portion 54 applies the current revolutions of the engine 11 and the fuel supply amount to the maximum boost pressure table D2 and outputs the signal S12 concerning the derived maximum boost pressure of the supercharger 42.

The second supercharging pressure calculation portion 55 is a portion for obtaining the boost pressure of the supercharger 42 from the limit value of the fuel supply amount to the engine 11 corresponding to the output upper limit value (that is, the output signal from the output upper limit conversion portion 53) of the engine 11. The correlation between the limit value of the fuel supply amount and the boost pressure of the supercharger 42 is stored in the nonvolatile memory 58 as a table Ds. The table D3 is fourth information in the present embodiment. In addition, the graphs G42 shown in FIG. 13 is consistent with one in which the table D3 is indicated as a graph.

The second supercharging pressure calculation portion 55 acquires the engine torque command signal S11 that is output from the limiter portion 52 so as to detect the fuel supply amount to the engine 11. The second supercharging pressure calculation portion 55 applies the current amount of fuel supply to the engine 11 to the table D3 and outputs the signal S13 concerning the derived boost pressure of the supercharger 42.

The signals S12 and S13, which are output from each of the first supercharging pressure calculation portion 54 and the second supercharging pressure calculation portion 55, are input to the calculation portion 59, and the difference thereof is calculated by the calculation portion 59. The supercharging pressure decision portion 56 decides whether or not the difference, that is, a difference between the maximum boost pressure obtained from the maximum boost pressure tale D2 and the boost pressure of the supercharger 42 from the table D3 is smaller than a predetermined threshold value. The supercharging pressure decision portion 56 outputs a binary signal, which indicates whether or not the difference is smaller than the predetermined threshold value, to the target revolution setting portion 57. For example, the supercharging pressure decision portion 56 outputs 1 when the difference falls below the predetermined threshold value, and the supercharging pressure decision portion 56 outputs 0 when the difference is equal to or greater than the predetermined threshold value. In addition, the case, where the difference falls below the predetermined threshold value, refers to a case where the graph G42 approaches the graph G41 in FIG. 13, and corresponds to a point P6. Herein, in the description mentioned above, the engine torque command signal S11 is input to the first and second supercharging pressure calculation portions 54 and 55, but the detection value of the engine torque may be input.

The target revolution setting portion 57 is a portion for calculating an objective value of the revolutions of the engine 11. The target revolution setting portion 57 sets a common revolution object when the difference between the maximum boost pressure obtained from the maximum boost pressure table D2 and the boost pressure of the supercharger 42 obtained from the table D3 is equal to or greater than a predetermined threshold value. Furthermore, the target revolution setting portion 57 sets a revolution object higher than the common revolution object when the difference is smaller than the predetermined threshold value. The target revolution setting portion 57 outputs the engine revolution command signal S14 indicating the revolution object to the revolution control portion 51 and the electric generator control portion 61.

The electric generator control portion 61 inputs the signal S3 concerning the rotation speed of the engine 11 from the speed sensor 11*a*, and inputs the engine revolution command signal S14 from the target revolution setting portion 57. The electric generator control portion 61 creates a signal S10 indicating the output command value of the electric generator 12 based on the signal. The electric generator control portion 61 causes the driving force of the engine 11 to assist the electric generator 12 by controlling the inverter circuit 18A (see FIG. 2) when the revolution object indicated in the engine revolution command signal S14 is equal to or greater than the current rotation speed of the engine 11 by a predetermined value. As a result, the rotation speed of the engine 11 can be increased and becomes close to the revolution object indicated in the engine revolution command signal S14.

In this manner, the revolutions of the engine 11 are increased using the driving force from the electric generator 12, whereby it is possible to increase the fuel supply amount to the engine 11 and the maximum boost pressure of the supercharger 42 depending on the revolutions of the engine 11. As a result, the graph G41 shown in FIG. 13 is translated to the graph G43, whereby the engine torque ratio and the boost pressure can be further increased along the path such as a solid line B in FIG. 13.

FIG. 15A is a graph that shows time changes of each of an output (a graph G51) of the engine 11, an output (a graph G52) of the electric generator (the assist motor), a hydraulic output (a graph G53) from the main pump 14, and the revolution (a graph G54) of the engine 11, in the hybrid-type working machine including the controller 50 mentioned above. A vertical axis and a horizontal axis of FIGS. 15A and 15B are the same as those of FIGS. 11A and 11B, respectively.

In FIG. 15, like FIG. 11, at the time when the time elapses by one second ($t_1$), the load is applied to the hydraulic system, and the driving force to be supplied to the main pump 14 is increased from Pa (kW) to Pb (kW). As a result, the engine revolution temporarily drops, and the boost pressure is low. However, the engine is assisted by the electric generator 12, whereby the revolutions of the engine 11 are stabilized based on the boundary of some timing, the boost pressure is gradually increased along with this, and the output of the engine 11 is increased. Moreover, the output of the electric generator 12 is gradually suppressed along with an increase in output of the engine 11.

Moreover, when the time elapses by four seconds ($t_4$), the revolution (the graph G54) of the engine 11 starts to increase. This is because the difference between the maximum boost pressure of the supercharger 42 depending on the revolutions of the engine 11 and the fuel supply amount and the boost pressure of the supercharger 42 obtained from the limit value of the fuel supply amount corresponding to the output upper limit value of the engine 11 is lower than a predetermined threshold value. That is, this is based on the fact that it is decided that the difference falls below the predetermined threshold value by the supercharging pressure decision portion 56, the target revolution is increased by the target revolution setting portion 57, and the electric generator 12 assists the driving force of the engine 11 by the electric generator control portion 61.

When the revolutions of the engine 11 are gradually increased by the assist of the electric generator 12 in this manner, the output (the graph G51) of the engine 11 is hereby increased (after about 5 seconds). Moreover, since the boost pressure (FIG. 15B) of the supercharger 42 is also hereby increased, the electric generator 12 does not need to assist the driving force of the engine 11, whereby, as shown in FIG. 15A, the output (the graph G52) of the electric generator 12 becomes close to zero.

In this manner, according to the hybrid-type working machine of the present embodiment, even when the situation as shown in FIG. 12B arises, it is possible to further increase the output of the engine 11. Moreover, since the situation can be avoided where a part of the driving force is successively supplied from the electric generator 12, the electric power accumulated in the battery 19 can be suitably maintained.

In addition, a predetermined threshold value used in the supercharging pressure decision portion 56 is not limited to a fixed value. For example, even when the predetermined threshold value is a value that is changed depending on the fuel supply amount (the engine torque command signal S11), the effect mentioned above can be suitably obtained.

Modified Example

Figure 16:
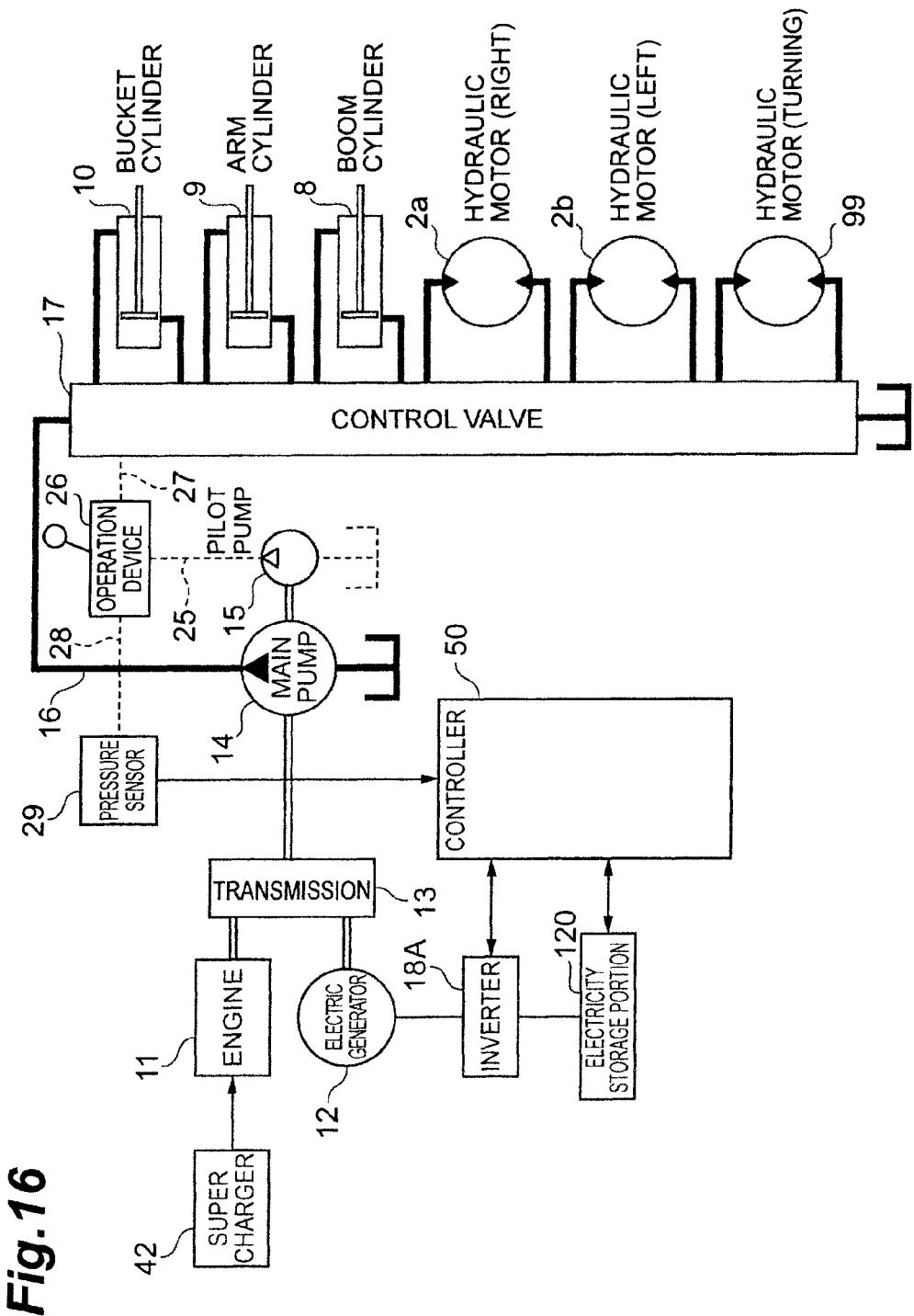
FIG. 16 is a block diagram that shows a modified example of an internal configuration such as an electric system or a hydraulic system of the hybrid-type construction machine.

FIG. 16 is a block diagram that shows a modified example of an internal configuration such as an electric system or a hydraulic system of the hybrid-type construction machine. In addition, in FIG. 16, a system for mechanically transmitting the power is indicated by double lines, the hydraulic system is indicated by a thick solid line, a steering system is indicated by dashed lines, and the electric system is indicated by a thin solid line, respectively. As shown in FIG. 16, the hybrid-type construction machine of the present modified example has hydraulic motors 2a and 2b, a boom cylinder 8, an arm cylinder 9, and a bucket cylinder 10, and further includes a turning hydraulic motor 99. The turning hydraulic motor 99 is provided instead of the turning motor 21, and is a power source of the turning mechanism 3 that turns the turner 4 shown in FIG. 1.

Furthermore, the hybrid-type construction machine of the present embodiment includes the engine 11, the electric generator 12, the transmission 13, the main pump 14, the pilot pump 15, the high pressure hydraulic line 16, the control valve 17, the inverter circuit 18A, the pilot line 25, the operation device 26, the hydraulic lines 26 and 28, the pressure sensor 29, the supercharger 42, the controller 50, and the electricity storage portion 120. The configuration and the function are the same as those of each embodiment mentioned above.

The hybrid-type construction machine of each embodiment mentioned above can sufficiently obtain the effect even in the configuration including the turning hydraulic motor 99 like the present modified example.

The hybrid-type working machine according to the present invention is not limited to the embodiments mentioned above but can variously changed. For example, in the embodiments mentioned above, the construction machine including the lifting magnet was shown, however, it is also possible to provide the present invention to a construction machine that includes various attachments such as a bucket instead of the lifting magnet. That is, in the embodiments mentioned above, the lifting magnet vehicle as the construction machine was described as an example, it is also apply the present invention to another construction machine (a shovel, a wheel loader, a crane or the like) including the hybrid structure or a working machine (for example, a forklift or the like) other than the construction machine.

INDUSTRIAL APPLICABILITY

The present invention can be used in a working machine such as, particularly, a hybrid-type construction machine.

REFERENCE SIGNS LIST

1 . . . HYBRID-TYPE CONSTRUCTION MACHINE
2 . . . R G MECHANISM
3 . . . TURNING MECHANISM
4 . . . TURNER
7 . . . LIFTING MAGNET
8 . . . BOOM CYLINDER
9 . . . ARM CYLINDER
10 . . . BUCKET CYLINDER
11 . . . ENGINE
11A . . . SPEED SENSOR
11B . . . BOOST PRESSURE SENSOR
12 . . . ELECTRIC GENERATOR
13 . . . TRANSMISSION
14 . . . MAIN PUMP
18A, 20A, 20B . . . INVERTER CIRCUIT
19 . . . BATTERY
21 . . . TURNING MOTOR
30 . . . CONTROLLER
31, 58 . . . NONVOLATILE MEMORY
32 . . . ENGINE LIMIT AMOUNT ESTIMATION PORTION
33 . . . COMPENSATION FUNCTION CALCULATION PORTION
34 . . . POWER DISTRIBUTION CALCULATION PORTION
35 . . . SIGNAL SELECTION PORTION
42 . . . SUPERCHARGER
50 . . . CONTROLLER
51 . . . REVOLUTION CONTROL PORTION
52 . . . LIMITER PORTION
53 . . . OUTPUT UPPER LIMIT CONVERSION PORTION
54 . . . FIRST SUPERCHARGING PRESSURE CALCULATION PORTION
55 . . . SECOND SUPERCHARGING PRESSURE CALCULATION PORTION
56 . . . SUPERCHARGING PRESSURE DECISION PORTION
57 . . . TARGET REVOLUTION SETTING PORTION

61 ... ELECTRIC GENERATOR CONTROL PORTION
62 ... OPEN AND CLOSE CONTROL PORTION
100 ... BUCK-BOOST CONVERTER
110 ... BUS
120 ... ELECTRICITY STORAGE PORTION
D1 ... ENGINE LIMIT TABLE
D2 ... MAXIMUM BOOST PRESSURE TABLE

The invention claimed is:

1. A hybrid-type working machine comprising:
an internal combustion engine motor;
a supercharger that supplies the internal combustion engine motor with compressed air;
an electric generator that is connected to the internal combustion engine motor to perform electricity generation by the driving force of the internal combustion engine motor, and assists the driving force of the internal combustion engine motor through its own driving force;
an inverter circuit that is connected to an electric terminal of the electric generator; and
a control portion that drives the inverter circuit and includes a memory portion, which stores first information indicating a correlation between the revolutions of the internal combustion engine motor, the supercharging pressure of the supercharger and an output upper limit value of the internal combustion engine motor,
wherein the control portion controls the inverter circuit so that the electric generator assists the driving force of the internal combustion engine motor when the required output exceeds the output upper limit value, based on first information stored in the memory portion, and
the control portion controls the inverter circuit based on at least three different signals which comprise a signal that indicates the revolutions of the internal combustion engine motor, a signal that indicates the supercharging pressure of the supercharger, and a signal that indicates the output upper limit value of the internal combustion engine motor.

2. The hybrid-type working machine according to claim 1, wherein the control portion controls the inverter circuit so as to perform electricity generation in the electric generator by the driving force of the internal combustion engine motor when the required output falls below the output upper limit value.

3. The hybrid-type working machine according to claim 1, wherein the control portion estimates the supercharging pressure of the supercharger based on the magnitude of the torque of the internal combustion engine motor.

4. The hybrid-type working machine according to claim 1, further comprising:
a supercharging pressure sensor that detects the supercharging pressure of the supercharger and provides information on the supercharging pressure to the control portion.

5. A hybrid-type working machine comprising:
an internal combustion engine motor;
a supercharger that supplies the internal combustion engine motor with compressed air;
an electric generator that is connected to the internal combustion engine motor to perform electricity generation by the driving force of the internal combustion engine motor, and assists the driving force of the internal combustion engine motor through its own driving force;
an inverter circuit that is connected to an electric terminal of the electric generator; and
a control portion that drives the inverter circuit and includes a memory portion, which stores first information indicating a correlation between the revolutions of the internal combustion engine motor, the supercharging pressure of the supercharger and an output upper limit value of the internal combustion engine motor,
wherein the control portion controls the inverter circuit so that the electric generator assists the driving force of the internal combustion engine motor when the required output exceeds the output upper limit value, based on first information stored in the memory portion,
the memory portion further stores second information on a maximum output value depending on the revolutions of the internal combustion engine motor, and
the control portion controls the inverter circuit by setting the maximum output value as an output upper limit value, when the maximum output value based on second information is smaller than the output upper limit value based on first information.

6. A hybrid-type working machine comprising:
an internal combustion engine motor;
a supercharger that supplies the internal combustion engine motor with compressed air;
an electric generator that is connected to the internal combustion engine motor to perform electricity generation by the driving force of the internal combustion engine motor, and assists the driving force of the internal combustion engine motor through its own driving force;
an inverter circuit that is connected to an electric terminal of the electric generator; and
a control portion that drives the inverter circuit and includes a memory portion, which stores first information indicating a correlation between the revolutions of the internal combustion engine motor, the supercharging pressure of the supercharger and an output upper limit value of the internal combustion engine motor,
wherein the control portion controls the inverter circuit so that the electric generator assists the driving force of the internal combustion engine motor when the required output exceeds the output upper limit value, based on first information stored in the memory portion,
the memory portion of the control portion further stores
third information which indicates a fuel supply amount to the internal combustion engine motor and a maximum supercharging pressure of the supercharger depending on the revolutions of the internal combustion engine motor; and
fourth information which indicates a correlation between a limit value of a fuel supply amount to the internal combustion engine motor corresponding to the output upper limit value and the supercharging pressure of the supercharger, and
when a difference between the maximum supercharging pressure obtained from the third information and the supercharging pressure of the supercharger obtained from the fourth information is lower than a predetermined threshold value, by controlling the inverter circuit so that the electric generator assists the driving force of the internal combustion engine motor, the revolutions of the internal combustion engine motor are increased.

7. The hybrid-type working machine according to claim 6, wherein the predetermined threshold value is changed depending on the fuel supply amount.

8. The hybrid-type working machine according to claim 6, wherein the control portion has
a supercharging pressure decision portion that calculates a difference between the maximum supercharging pressure obtained from the third information and the supercharging pressure of the supercharger obtained from the fourth information and determines the magnitude between the difference and a predetermined threshold value; and an target revolution setting portion that sets an target revolution of the internal combustion engine higher than a case where it is determined that the difference exceeds the predetermined threshold value, when it is determined that the difference in the supercharging value decision portion falls below the predetermined threshold value, and the control portion controls the inverter circuit so that the revolutions of the internal combustion engine motor reach the target revolution.

* * * * *